(12) United States Patent
Klein

(10) Patent No.: US 11,459,773 B2
(45) Date of Patent: Oct. 4, 2022

(54) MAGNETIC FLOORING SYSTEM AND MAGNETIC CLIP FOR USE THEREWITH

(71) Applicant: Matthew Peter Klein, Calgary (CA)

(72) Inventor: Matthew Peter Klein, Calgary (CA)

( * ) Notice: Subject to any disclaimer, the term of this patent is extended or adjusted under 35 U.S.C. 154(b) by 0 days.

(21) Appl. No.: 17/155,422

(22) Filed: Jan. 22, 2021

(65) Prior Publication Data

US 2021/0381249 A1 Dec. 9, 2021

Related U.S. Application Data

(62) Division of application No. 16/098,910, filed as application No. PCT/CA2017/050576 on May 12, 2017, now Pat. No. 10,927,551.

(Continued)

(51) Int. Cl.
*F16M 11/00* (2006.01)
*E04F 13/08* (2006.01)
(Continued)

(52) U.S. Cl.
CPC .... *E04F 13/0883* (2013.01); *E04F 15/02044* (2013.01); *E04F 15/02144* (2013.01);
(Continued)

(58) Field of Classification Search
CPC .......... E04F 15/02044; E04F 15/02144; E04F 19/0472; E04F 13/0883; F16M 5/128
See application file for complete search history.

(56) References Cited

U.S. PATENT DOCUMENTS 4,709,522 A 12/1987 Carnahan
10,927,551 B2 2/2021 Klein
(Continued)

FOREIGN PATENT DOCUMENTS

CN 104005543 A 8/2014
DE 102012210607 A1 4/2013
(Continued)

OTHER PUBLICATIONS

EPO, Extended European search report dated Jan. 8, 2020 in European foreign counterpart application No. 17798440.8.
(Continued)

*Primary Examiner* — Amy J. Sterling
(74) *Attorney, Agent, or Firm* — ATMAC Patent Services Ltd.; Andrew T. MacMillan

(57) ABSTRACT

A magnetic attachment assembly for attaching a first object to a second object includes a first and second ferromagnetic devices possessing an attractive magnetic property pulling each toward one another. The first ferromagnetic device is attached to the first object and an adhesive layer on the second ferromagnetic device is for attaching the second ferromagnetic device to the second object. A removable separator is initially positioned intermediate the first ferromagnetic device and the second ferromagnetic device and is frictionally held in place prior to attachment of the second ferromagnetic device to the second object. During installation, the user pushes the attachment assembly onto the second object, pulls the first ferromagnetic device away from the second ferromagnetic device, removes the separator, and then pushes the first ferromagnetic device back to the second ferromagnetic device thereby attaching the first object to the second object.

13 Claims, 23 Drawing Sheets

Related U.S. Application Data

(60) Provisional application No. 62/338,368, filed on May 18, 2016.

(51) Int. Cl.
*E04F 15/02* (2006.01)
*F16B 5/12* (2006.01)
*E04F 19/04* (2006.01)
*F16B 1/00* (2006.01)

(52) U.S. Cl.
CPC .......... *E04F 19/0472* (2013.01); *F16B 5/128* (2013.01); *E04F 2015/02072* (2013.01); *F16B 2001/0035* (2013.01)

(56) References Cited

U.S. PATENT DOCUMENTS

| | | |
|---|---|---|
| 2004/0040195 A1 | 3/2004 | Copley |
| 2007/0017174 A1* | 1/2007 | Lavell ..................... E04F 19/04 52/267 |
| 2008/0173659 A1 | 7/2008 | Medley |
| 2008/0217505 A1 | 9/2008 | Cohoon |
| 2008/0296450 A1 | 12/2008 | Lang |
| 2011/0083254 A1 | 4/2011 | Trutna et al. |
| 2015/0191912 A1* | 7/2015 | Bordener ................ E04F 13/10 52/772 |
| 2015/0342372 A1 | 12/2015 | Chafe |
| 2015/0368911 A1* | 12/2015 | Kuijper ............. E04F 15/02044 52/745.13 |
| 2016/0244981 A1 | 8/2016 | Klein |
| 2017/0058536 A1* | 3/2017 | Walens ..................... F21S 4/00 |
| 2017/0254094 A1* | 9/2017 | Krausz ................... B32B 9/002 |

FOREIGN PATENT DOCUMENTS

| | | |
|---|---|---|
| JP | 2006089956 A | 4/2006 |
| WO | 2004113644 A1 | 12/2004 |
| WO | 2007004908 A1 | 1/2007 |
| WO | 2009099664 A1 | 8/2009 |

OTHER PUBLICATIONS

ISA/CA, "Written Opinion of the International Searching Authority", PCT/CA2017/050576, dated Aug. 30, 2017.

ISA/CA, "International Search Report", PCT/CA2017/050576, dated Aug. 30, 2017.

* cited by examiner

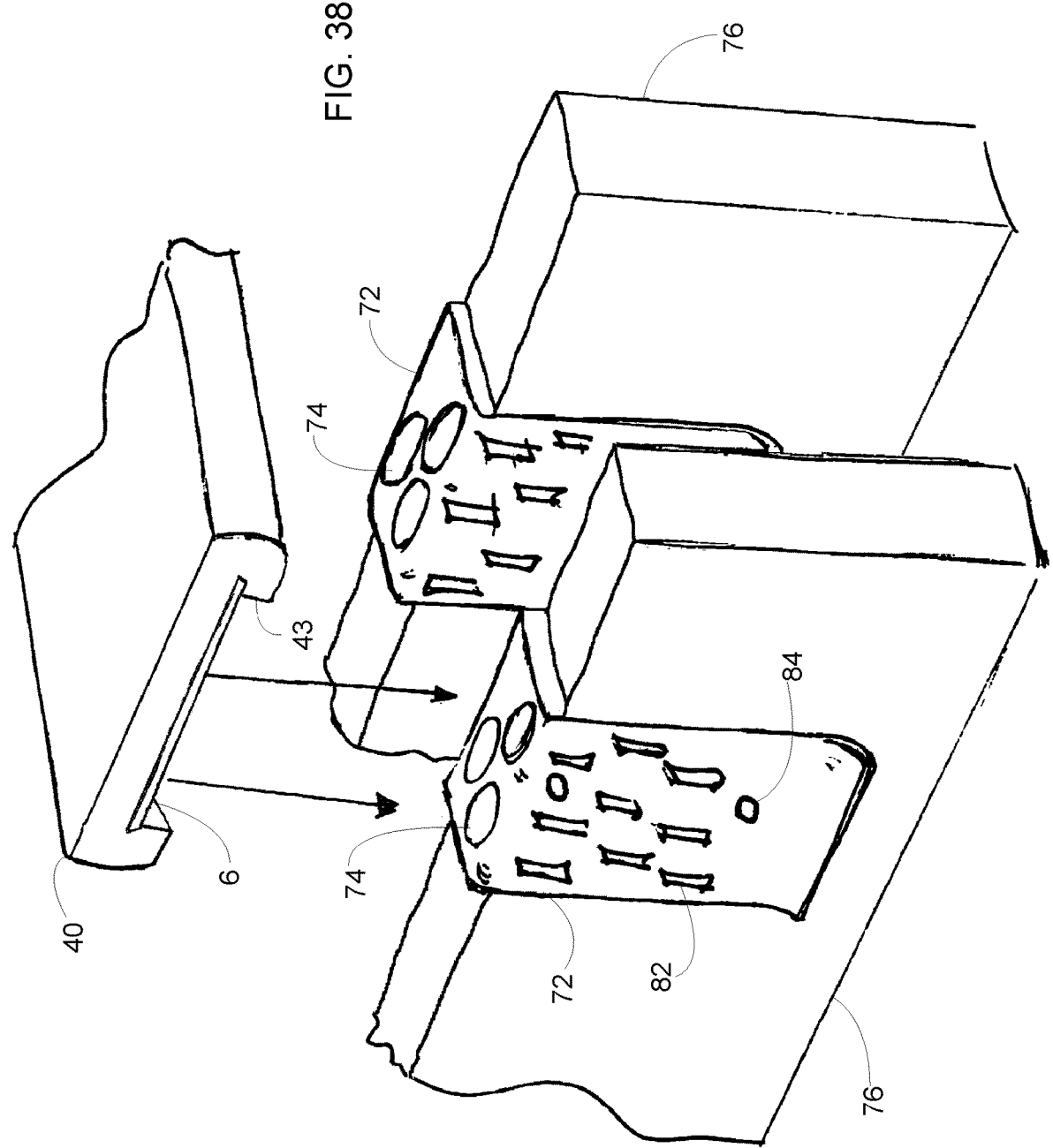

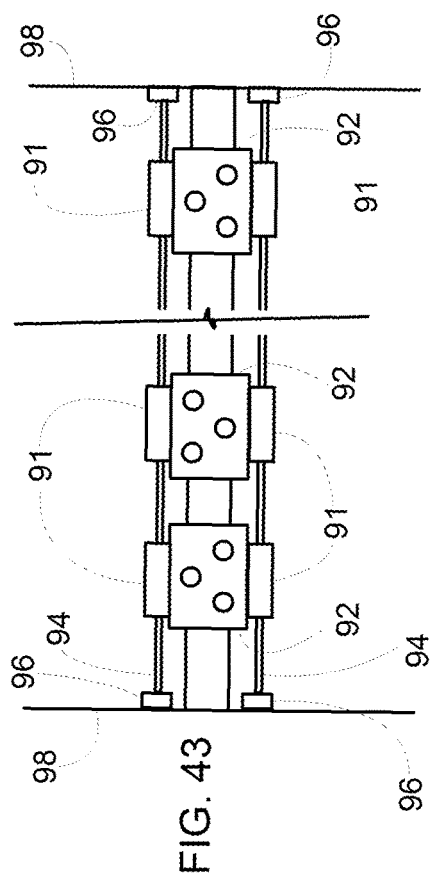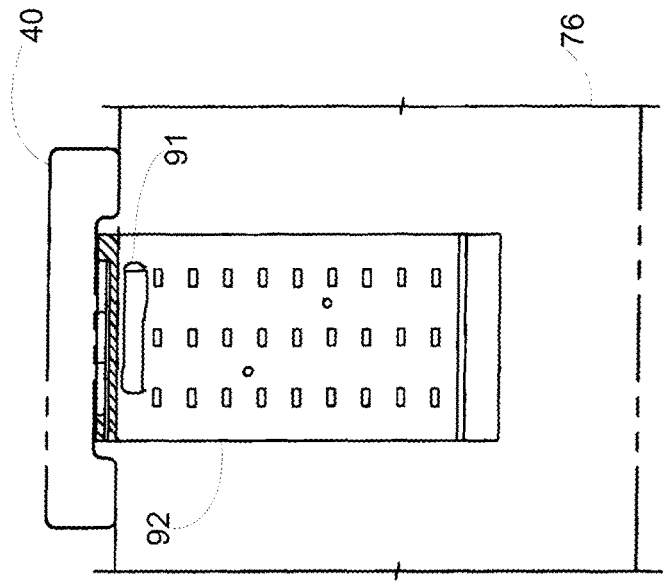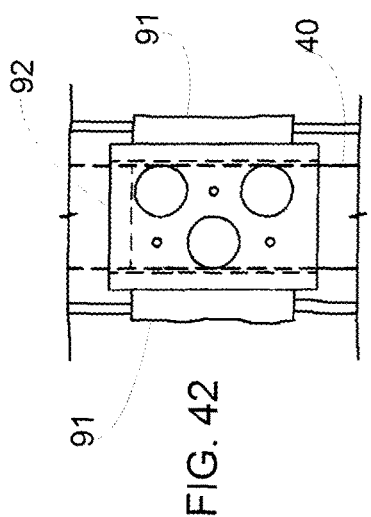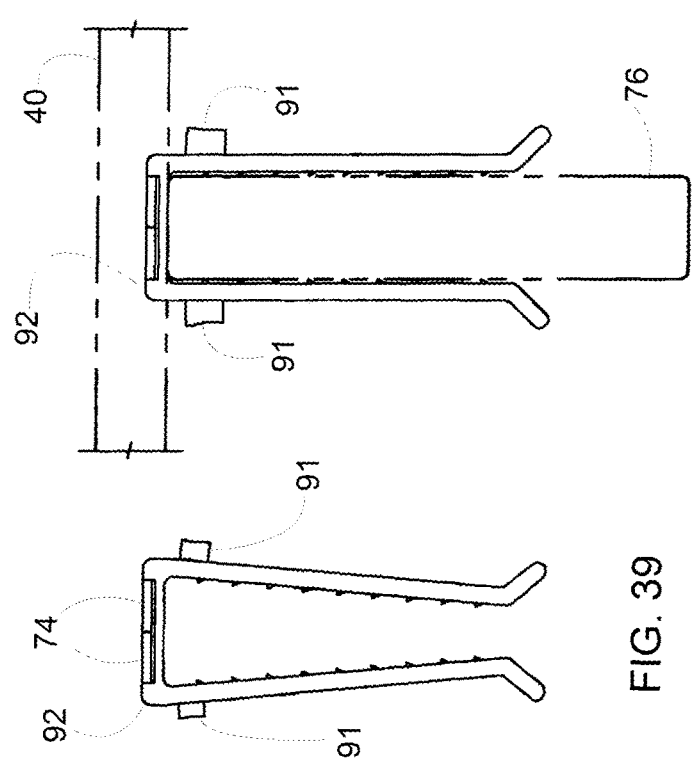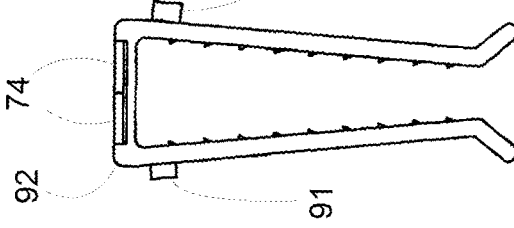

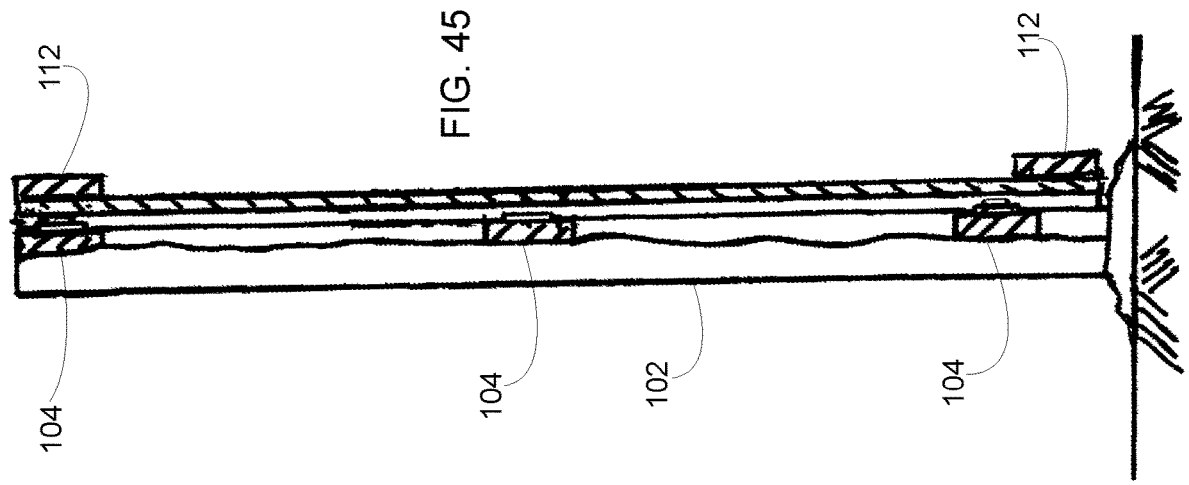
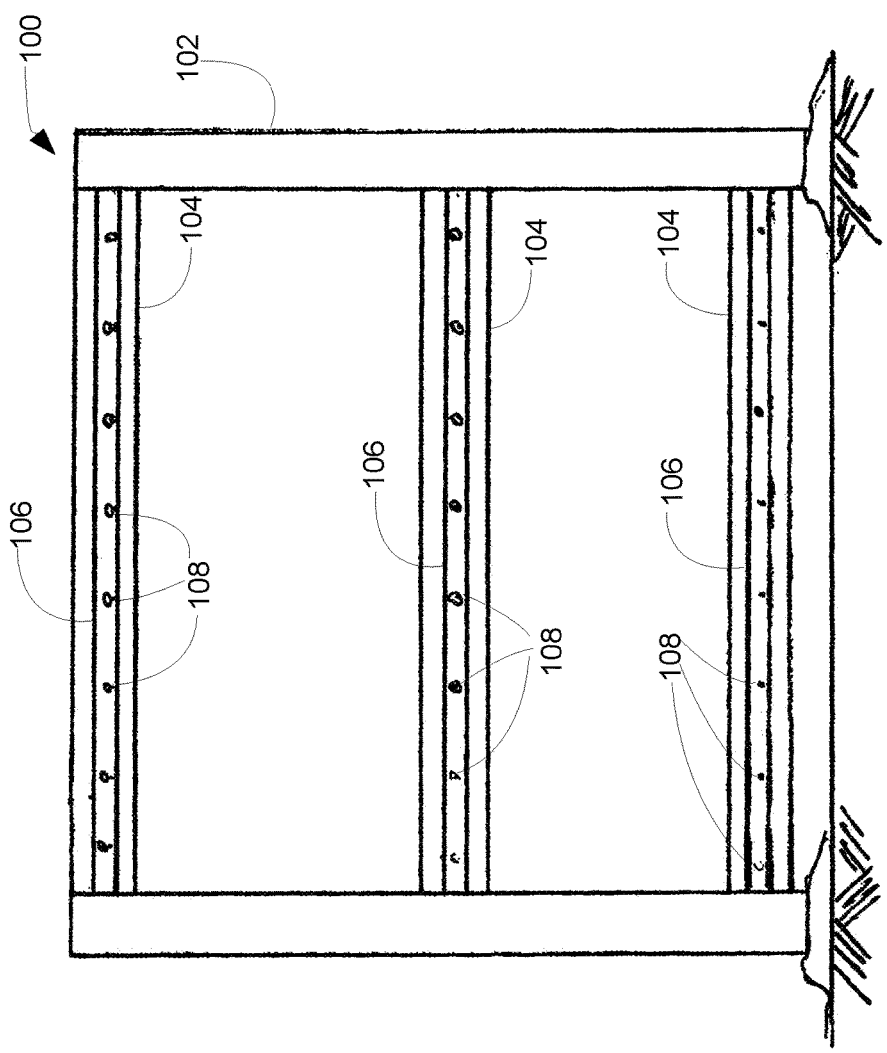

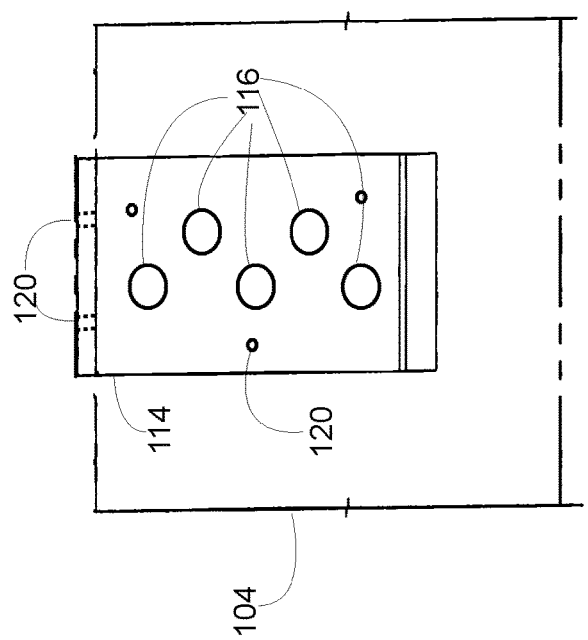
FIG. 48
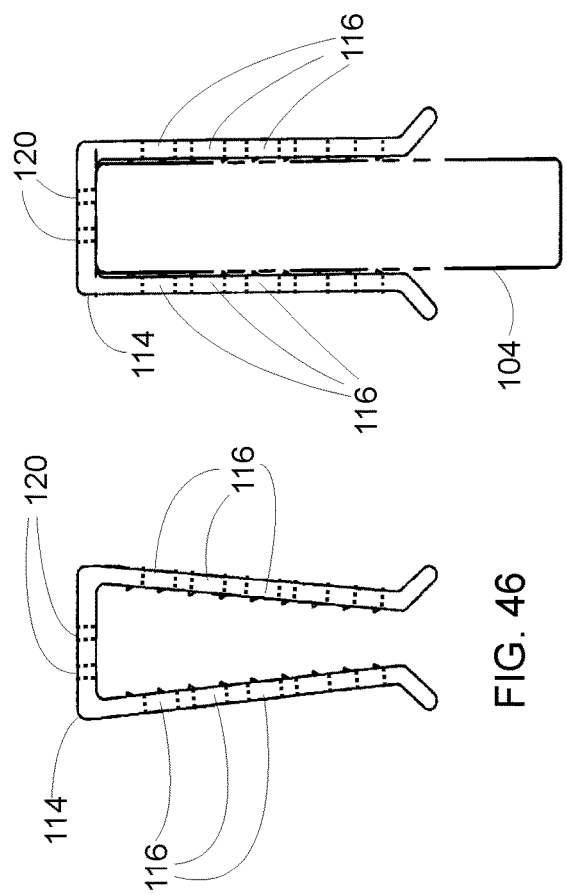
FIG. 47
FIG. 46
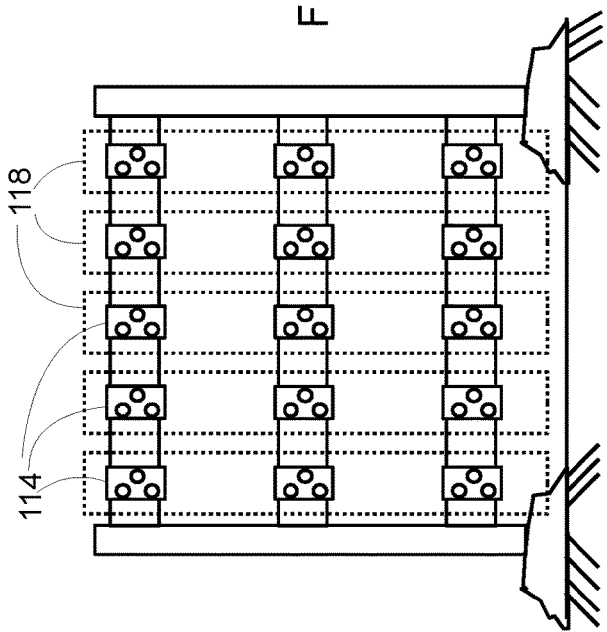
FIG. 49

MAGNETIC FLOORING SYSTEM AND MAGNETIC CLIP FOR USE THEREWITH

CROSS-REFERENCE TO RELATED APPLICATIONS

This application is a divisional of U.S. patent application Ser. No. 16/098,910 filed Nov. 5, 2018, which is a PCT national entry of PCT/CA2017/050576 filed May 12, 2017, which claims the benefit of priority of U.S. Provisional Patent Application No. 62/338,368 filed May 18, 2016. All of the above applications are incorporated herein by reference.

BACKGROUND OF THE INVENTION

(1) Field of the Invention

The invention relates to mounting objects to one another and, more particularly, to mounting objects to one another utilizing magnetic attachments.

(2) Description of the Related Art

It is well known to affix materials such as trim, moldings, decking and the like to a substructure, such as a wall or a frame, including, but not limited to, a plurality of spaced apart studs or joists.

With respect to trim and moldings, many designs and types of ceiling/wall moldings are found in today's home decorating market. For the non-expert, moldings not only decorate a room, they also hide errors in construction or painting. When first installed, they may hide any uneven painting, particularly adjacent the ceiling or floors, done when either walls or ceilings were first painted. However, when a ceiling or wall needs repainting, the job becomes difficult, since it is not easy to avoid getting paint on the molding.

Current, standard installation practices for trim use fasteners such as nails or staples. Once the trim has been put fixed in place, it is not easily removable. Trim is typically removed to change the appearance of the permanent structure or surface on which the trim is attached, typically a wall, a ceiling or flooring or to change the appearance of the trim itself. A change in appearance can include painting, wallpapering, and texturing or new floor installation. During removal, the trim is often broken or damaged as a result of tools used to remove or release the fasteners. Once the trim is removed, the trim needs to be reinstalled with fasteners. The fasteners typically create holes in the trim which are then filled, such as with a wood filler or caulking and which is color matched such as by touching up with paint.

When the trim is not removed or is not removeable, the standard practice for painting or texturing the surface becomes an issue for the typical un-skilled person. If the trim is not removed, the trim is taped off at all edges adjacent the area to be painted or textured to insure the product being applied is not accidentally applied to the trim. Once the appearance change has been completed, all tape must be removed. Should the tape remove paint or other finish from the trim, the trim must then be touched up.

When painting the trim itself, tape is used to cover and protect the floor and structure to insure unwanted paint does not come in contact with those items. The process of painting trim generally requires precise painting skills. Once the application of paint to the trim has been completed, all tape must be removed.

When installing flooring and wallpaper, each must be cut precisely to match any imperfections in the structure or trim. The imperfections or gaps remaining after installation of the flooring or wallpaper and the like are then hidden with caulking or other fill, or are left imperfect and unfinished.

Using the standard practices to apply liquid compounds, such as paint or texture as described above, has several drawbacks. Preparation time to tape off the desired area, whether it is the trim itself or the surface or permanent structure is time consuming and labor intensive. Using tape is not precise and can still cause unwanted results. Removing the tape can be messy. To apply the tape or painting the trim, especially floor trim, the painter or applier is often in uncomfortable positions for extended periods of time. Often times, the painter or applier is in a crouched or sitting position and must scoot along the floor every couple of minutes to apply tape or change the appearance of the trim to a different portion of the surface. When reinstalling the trim, the painter or applier must fill the holes created by the fasteners and touch up the filled area with a color match, typically with paint.

With respect to decking materials, each piece of decking material, must be laid out on the substructure, typically a plurality of spaced apart joints, leaving a gap between each piece to allow for expansion and contraction. For aesthetics, the gap must be uniform. Each piece of decking material, whether wood, plastic, composite or other, must then be fastened to each of the joists to ensure a strong, solid structure. Depending upon the material and the desired aesthetic, each piece of material can be nailed or screwed at intervals therealong to coincide with each of the joists. Typically, depending upon the width of each piece of decking material two or more fasteners are used spaced across the piece of material and into a single joist.

Alternatively, particularly for composite decking systems, specialized fasteners are used which engage along each edge of the piece of material and into the joists, leaving the surface of the decking material unmarred by the appearance of nail or screw heads. Such systems also avoid problems which arise when the nails or screws protrude upwardly therefrom, including, but not limited to, engaging the edge of snow removal equipment or creating a hazard for damage to deck furniture and other inanimate objects or to people on the deck.

As each piece of decking material is positioned in close proximity to the adjacent pieces of material, gaps therebetween typically being small to avoid catching a heel of a shoe or other objects therein, when a piece of material needs replacing more than one piece of material must be removed to access the damaged piece. In the course of removal of the material and the fasteners used to secure the material to the joist, the fasteners and the materials may be damaged. As the orientation of the materials often results in the damaged areas aligning with the joists, considerable time may be spent in trying to orient the materials otherwise. When this is not possible, it may be necessary to replace more material than was initially damaged.

Standard polyvinyl chloride (PVC) decking is hard-fixed to a structure of a deck base as a result of rates of expansion and contraction in heat and cold. When permanently fixing PVC to a structure, expansion and contraction has been shown to twist and warp deck board, expose gaps and fasteners as well as break screws and tear off screw heads.

Thus, what is needed are methods and apparatus for securely mounting materials to a surface for easy removal and re-application thereto.

BRIEF SUMMARY OF THE INVENTION

Embodiments taught herein provide apparatus and methods for securely mounting a material to a surface, using a magnetic attachment. Embodiments are useful for mounting trim, moldings and the like to a wall, for attaching fence boards to a fence frame, for mounting decks boards to deck joists and other similar applications. A magnet or a plurality of axially extending spaced-apart magnets is affixed to either the material to be secured or the surface on which the material is to be secured. The magnetic conductor, typically a strip of suitable metal such as steel, is affixed to the opposing surface or material such that when the magnetic conductor is attracted to the magnets, the material is secured to the surface.

In embodiments, molding or trim can be installed to a structure wherein the molding can be easily removed without damaging the molding or the structure. The molding is attached to the structure using magnets by securing the molding to the structure using the magnetic bond between a magnetic conductor and magnet.

In one embodiment, the magnet is secured to the trim and the magnetic conductor is secured to the structure. In a further embodiment, the magnet and conductor combination can reside substantially flush within a recess in the trim. The magnet is secured in the recess using an adhesive layer. The magnetic apparatus provides ease of initial installation and ease of the removal and replacement of the trim when painting and installing flooring.

In greater detail, embodiments include removable and remountable trim molding for walls and ceilings of structure such as a residential and commercial dwelling. The trim molding includes a magnet attached to the trim molding and wherein the magnet is adapted to be coupled to a magnetic conductor attached to structure. The magnet can reside within a recess in the trim molding. In an embodiment, the magnet or a plurality of axially spaced-apart magnets extends substantially the length of the trim molding. Additionally, the conductor can extend the same by being substantially the length of the trim molding attached to the structure.

In a further embodiment, the magnetic conductor is attached to a trim molding, with the magnetic conductor being adapted to be coupled to a magnet or a plurality of axially spaced-apart magnets attached to the structure. The magnetic conductor may reside within a recess within the trim. The recess may be sized to have a depth such that the trim is substantially flush with the wall surface of the structure when the magnet and magnetic conductor are coupled together to form a magnetic bond.

An additional embodiment includes a removable and remountable trim molding kit for ceilings and walls of structure. The kit includes a magnet or a plurality of magnets and a magnetic conductor. The magnet or magnets have a first surface to which an adhesive layer may be applied or otherwise attached. The magnetic conductor also has a first surface to which an adhesive layer may be applied or otherwise attached. The adhesive layer is attached to at least one of the first surfaces of either the magnet or magnetic conductor. Second surfaces of the magnet or magnets and the magnetic conductor operatively align to form a magnetic bond.

Furthermore, the kit includes a trim piece having a recess whereby the recess is operatively sized to house the magnet or magnets or the conductor. Additionally, the adhesive layer may reside on both the first surface of the magnetic conductor and the first surface of the magnet. A release paper may be included and operatively aligned with the adhesive layer to aid in transport of the kit components and is removed for installation.

A further embodiment includes a method of securing the removable and remountable trim molding to a structure including providing both a magnet and conductor. The method includes affixing the magnet to the trim molding and affixing the magnetic conductor to the structure. The affixation of the magnet and magnetic conductor may also be reversed in a further embodiment. The magnet and magnetic conductor are operatively aligned to secure the trim and molding to the structure.

In embodiments, the elongate recess, which is formed in and extends axially therealong in the trim, deck or fence boards, is profiled, such as in a dovetail shape to retain a strip of the magnetic conductor, typically a relatively thin metal strip, therein. The profiled shape aids in mechanically securing the conductor therein in combination with the adhesive bonding.

Alternatively, axially slots extend radially outward from the elongate recess into a body of the trim, decking or fence board and the conductor strip is slid, from an end of the recess, into the recess and slots for mechanically retaining the conductor strip therein, without the need for adhesive.

According to an exemplary embodiment of the invention there is disclosed a removable and remountable trim molding for walls and ceilings, the trim molding comprising: a magnet attached to a trim molding and wherein the magnet is adapted to be coupled to a magnetic conductor attached to structure. According to an exemplary embodiment of the invention there is disclosed a removable and remountable trim molding for walls and ceilings wherein the magnet resides within a recess in the trim molding. According to an exemplary embodiment of the invention there is disclosed a removable and remountable trim molding for walls and ceilings wherein the magnet extends substantially the length of the trim molding. According to an exemplary embodiment of the invention there is disclosed a removable and remountable trim molding for walls and ceilings wherein the magnetic conductor extends substantially the length of the trim molding to be attached to the structure. According to an exemplary embodiment of the invention there is disclosed a removable and remountable trim molding for walls and ceilings, the trim molding comprising: a magnetic conductor attached to a trim molding and wherein the magnet conductor is adapted to be coupled to a magnet attached to structure.

According to an exemplary embodiment of the invention there is disclosed a removable and remountable trim molding for walls and ceilings, wherein the magnetic conductor resides within a recess in the trim molding. According to an exemplary embodiment of the invention there is disclosed a removable and remountable trim molding for walls and ceilings, wherein the magnetic conductor extends substantially the length of the trim molding. According to an exemplary embodiment of the invention there is disclosed a removable and remountable trim molding for walls and ceilings, wherein the magnet extends substantially the length of the trim molding to be attached to the structure. According to an exemplary embodiment of the invention there is disclosed a removable and remountable trim molding kit for ceilings and walls, wherein the kit comprising: a magnet and a magnetic conductor, the magnet having a first surface and the magnetic conductor having a first surface; and an adhesive layer attached to at least one of the first surfaces of either the magnet or magnetic conductor, and wherein the second surfaces of the magnet and magnetic conductor are operatively aligned to form a magnetic bond.

According to an exemplary embodiment of the invention there is disclosed a kit for a removable and remountable trim molding for ceilings and walls, further including a trim piece having a recess whereby the recess is operatively sized to house the magnet or conductor. According to an exemplary embodiment of the invention there is disclosed a kit for a removable and remountable trim molding for ceilings and walls, wherein the recess is sized such that the trim piece is substantially flush with a surface of a structure when the combination of the magnet and magnetic conductor reside with the recess. According to an exemplary embodiment of the invention there is disclosed a kit for a removable and remountable trim molding for ceilings and walls, further including a release paper operatively aligned with the adhesive layer. According to an exemplary embodiment of the invention there is disclosed a kit for a removable and remountable trim molding for ceilings and walls, wherein the adhesive layer resides on both the first surface of the magnetic conductor and the first surface of the magnet. According to an exemplary embodiment of the invention there is disclosed a kit for a removable and remountable trim molding for ceilings and walls, further including a trim piece including the magnet residing within a recess of the trim piece and the magnet affixed to the trim piece and operatively aligned with the magnetic conductor having the adhesive layer.

According to an exemplary embodiment of the invention there is disclosed a kit for a removable and remountable trim molding for ceilings and walls, further including a trim piece including the magnetic conductor residing within a recess of the trim piece and the magnetic conductor affixed to the trim piece and operatively aligned with the magnet having the adhesive layer. According to an exemplary embodiment of the invention there is disclosed a method of securing removable and remountable trim molding to a structure, the method comprising: providing a magnet; providing a magnetic conductor; affixing the magnet to the trim molding; affixing the magnetic conductor to the structure; and operatively aligning the magnet and magnetic conductor and securing the trim molding to the structure. According to an exemplary embodiment of the invention there is disclosed a method of securing removable and remountable trim molding to a structure, wherein the magnet is mechanically affixed to the trim molding. According to an exemplary embodiment of the invention there is disclosed a method of securing removable and remountable trim molding to a structure, wherein the magnet is adhesively affixed to the trim molding and the magnetic conductor is adhesively affixed to the structure. According to an exemplary embodiment of the invention there is disclosed a method of securing removable and remountable trim molding to a structure, the method comprising: providing a magnet; providing a magnetic conductor; affixing the magnetic conductor to the trim molding; affixing the magnet to the structure; and operatively aligning the magnet and magnetic conductor and securing the trim molding to the structure. According to an exemplary embodiment of the invention there is disclosed a method of securing removable and remountable trim molding to a structure, wherein the magnetic conductor is mechanically affixed to the trim molding.

According to an exemplary embodiment of the invention there is disclosed a magnetic attachment assembly for attaching a first object to a second object. The magnetic attachment assembly includes a first ferromagnetic device for attachment to the first object, and a second ferromagnetic device adjacent the first ferromagnetic device. The first ferromagnetic device and the second ferromagnetic device in combination possessing an attractive magnetic property pulling each toward one another. An adhesive layer is affixed on a side of the second ferromagnetic device that faces away from the first ferromagnetic device. The adhesive layer is for attaching the second ferromagnetic device to the second object. A removable separator is temporarily positioned intermediate the first ferromagnetic device and the second ferromagnetic device. When in place, the removable separator holds the second ferromagnetic device a predetermined distance away from the first ferromagnetic device. The predetermined distance does not prevent the attractive magnetic property from overcoming forces of gravity on the second ferromagnetic device. Prior to attaching the second ferromagnetic device to the second object, the second ferromagnetic device is magnetically held in an initial position adjacent the first ferromagnetic device with the removable separator frictionally held therebetween.

According to an exemplary embodiment of the invention there is disclosed a method of attaching a first object to a second object. The method includes attaching a first ferromagnetic device to the first object, and providing a second ferromagnetic device adjacent the first ferromagnetic device with a removable separator intermediate the first ferromagnetic device and the second ferromagnetic device. The first ferromagnetic device and the second ferromagnetic device in combination possess an attractive magnetic property pulling each toward one another, the removable separator holds the second ferromagnetic device a predetermined distance away from the first ferromagnetic device. The predetermined distance does not prevent the attractive magnetic property from overcoming forces of gravity on the second ferromagnetic device, and prior to attaching the second ferromagnetic device to the second object. The second ferromagnetic device is magnetically held in an initial position adjacent the first ferromagnetic device with the removable separator frictionally held therebetween. The method further includes pushing the first object toward the second object such that an adhesive layer affixed on a side of the second ferromagnetic device that faces away from the first ferromagnetic device is pushed against the second object, the adhesive layer thereby attaching the second ferromagnetic device to the second object. The method further includes pulling the first object away from the second object to thereby overcome the attractive magnetic property and pull the first ferromagnetic device away from the second ferromagnetic device attached to the second object. The method further includes, after the first ferromagnetic device is pulled away from the second ferromagnetic device, removing the removable separator from between the first ferromagnetic device and the second ferromagnetic device. The method further includes pushing the first object toward the second object such that attractive magnetic property pulls the first ferromagnetic device against the second ferromagnetic device thereby attaching the first object to the second object.

According to an exemplary embodiment, a magnetic attachment assembly for attaching a first object to a second object includes a first and second ferromagnetic devices possessing an attractive magnetic property pulling each toward one another. The first ferromagnetic device is attached to the first object and an adhesive layer on the second ferromagnetic device is for attaching the second ferromagnetic device to the second object. A removable separator is initially positioned intermediate the first ferromagnetic device and the second ferromagnetic device and is frictionally held in place prior to attachment of the second ferromagnetic device to the second object. During installation, the user pushes the attachment assembly onto the second object, pulls the first ferromagnetic device away from the second ferromagnetic device, removes the separator, and then pushes the first ferromagnetic device back to the second ferromagnetic device thereby attaching the first object to the second object.

According to an exemplary embodiment of the invention there is disclosed a flooring system having a first ferromagnetic device affixed to an upper surface of a floor joist. A flooring piece has a slot formed along an undersurface of the flooring piece and running lengthwise along the flooring piece. A second ferromagnetic device is positioned within the slot. The first ferromagnetic device and the second ferromagnetic device in combination possess an attractive magnetic property pulling each toward one another. The flooring piece is positioned over and across the floor joist such that the second ferromagnetic device within the slot is adjacent the first ferromagnetic device affixed to the floor joist and the attractive magnetic property between the first ferromagnetic device and the second ferromagnetic device magnetically bonds the flooring piece to the flooring joist.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof:

FIG. 38 is a perspective view of a decking system incorporating deck clips of FIGS. 33-37; and FIG. 39 illustrates a side view of a deck clip with securing loops on the sides prior to installation on a joist according to an exemplary embodiment;

FIG. 40 illustrates a side view of the deck clip of FIG. 38 after installation on a joist;

FIG. 41 illustrates an end view of the deck clip of FIG. 38 while installed on the joist;

FIG. 42 illustrates a plan view of the deck clip of FIG. 38 while installed on the joist and secured with metal bars;

FIG. 43 illustrates a plan view of a plurality of deck clips of FIG. 38 installed on a joist and secured with metal bars;

FIG. 44 illustrates a side view of a fence frame with strips of magnets attached thereto according to an exemplary embodiment;

FIG. 45 is a cross section view of the fence frame of FIG. 44 illustrating application of a fence board to the fence frame according to an exemplary embodiment;

FIG. 46 illustrates a side view of a fence clip prior to installation on a fence board according to an exemplary embodiment;

FIG. 47 illustrates a side view of the fence clip of FIG. 46 after installation on a fence frame board;

FIG. 48 illustrates an end view of the fence clip of FIG. 47 while installed on the fence frame board;

FIG. 49 illustrates a side view of a fence frame with a plurality of fence clips of FIG. 46 installed on the frame boards according to an exemplary embodiment;

DETAILED DESCRIPTION

Figure 1:
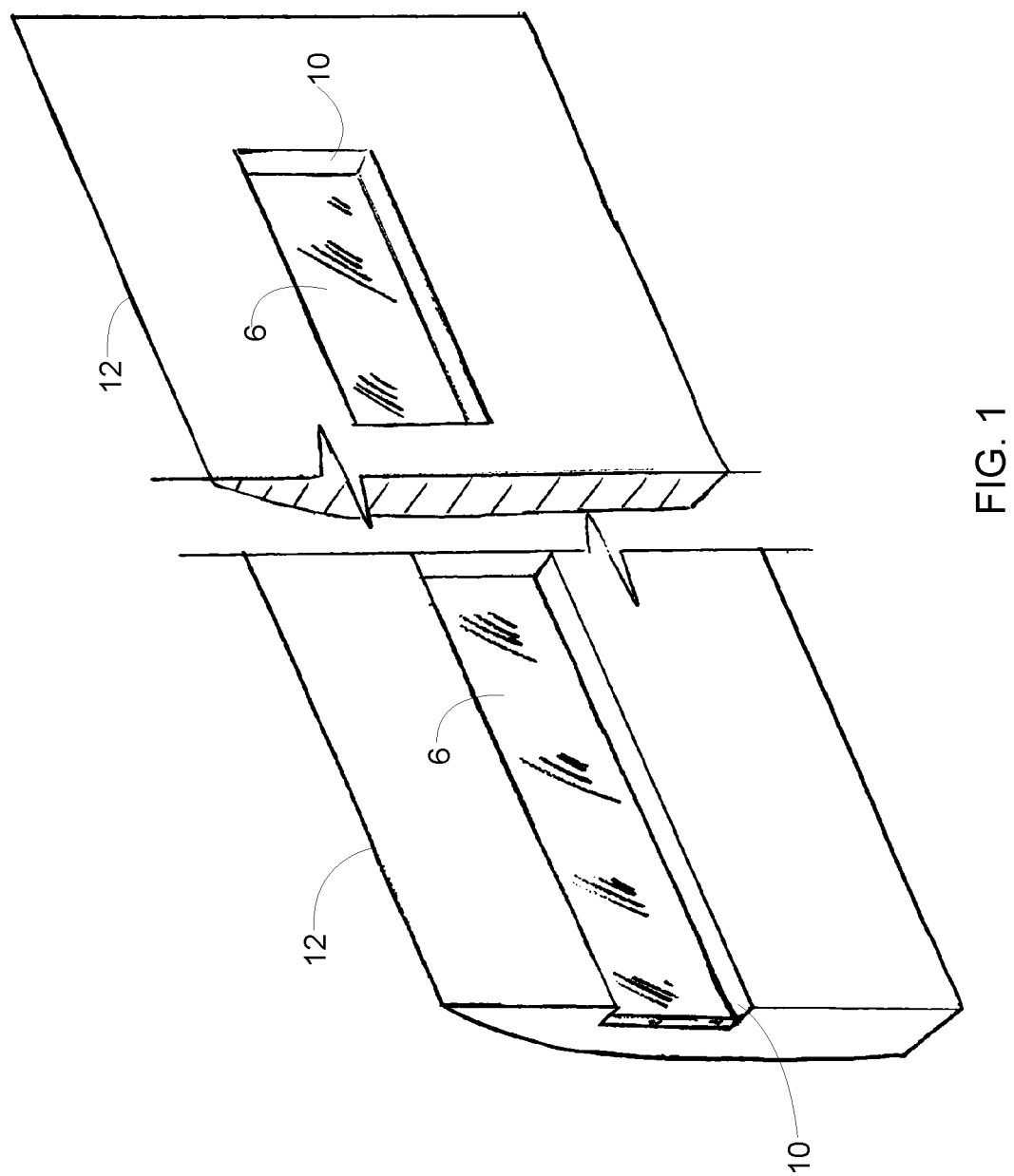
FIG. 1 illustrates a perspective view of a trim molding having a recess for receiving a magnetic attachment assembly according to an exemplary embodiment.

Embodiments are disclosed herein for use in mounting material, such as trim or molding to a surface such as a wall and/or ceiling, for use in mounting fence boards to a fence frame, for mounting decking to deck joists and in any other suitable situation. In some embodiments a plurality of axially spaced-apart magnets are affixed to either the material or to the surface and a magnetic conductor is mounted to the opposing surface or material.

Disclosed is an apparatus and kit for installing molding such as baseboards and crown molding to a structure. The molding is attached to the structure using magnets by securing the molding to the structure using the magnetic bond between a magnetic conductor and magnet. The installed molding is easily removed without damaging the molding or the structure simply by breaking the magnetic bond.

In some embodiments, the magnet is secured to the trim and the conductor is secured to the structure. In other embodiments, the magnet and conductor combination can reside substantially flush within a recess in the trim and are secured using an adhesive layer. An additional embodiment includes a kit providing a magnet and magnetic conductor and a trim piece configured to house each to facilitate the installation of the trim. The present magnetic apparatus provides ease of initial installation of the removal and replacement of the trim when painting and installing flooring.

In greater detail, the removable and remountable trim molding secured by a magnetic bond to a structure includes various embodiments. The magnetic attachment assembly includes both a magnet and magnetic conductor which can be assembled in various configurations to bond a molding trim to a structure. The term "trim" is inclusive such trim moldings as baseboards, crown moldings, window and door trim and door jams and the like. The term "structure" includes the walls and ceilings of most any building or dwelling where trim may be applied.

The term "magnetic conductor" is inclusive of any material attracted to a magnet to form a magnetic bond. By way of example and not limitation, the term may include most any suitable metal, such as in a thin sheet or even a wire mesh. Additionally, some metallic paints may have sufficient bonding potential. Other magnets may be utilized as magnetic conductors in some embodiments. The term "magnet" is inclusive of any material or object that produces a magnetic field. In an embodiment, the magnet is a permanent magnet or a material that creates its own persistent magnetic field. An embodiment includes a metallic permanent magnet. Embodiments include rare-earth magnets or may include plastic materials which are formulated to be magnetic.

In one embodiment, the magnetic attachment assembly includes the trim molding having a magnet attached to the trim and the magnetic conductor attached to the structure to which the molding is applied. However, such an arrangement may be reversed. For example, the magnetic conductor may be attached to the molding trim and the magnet to the structure.

The magnet can reside within a recess in the trim molding to help the molding sit flush with the wall or ceiling of the structure. The recess is sized such that the trim piece is substantially flush with a surface of a structure when the magnetic attachment assembly comprising the combination of the magnet and magnetic conductor reside with the recess. The term "substantially flush" includes the appearance of unity between wall or structure and the trim, but allows for some gap between the trim and wall that does not detract from appearance. In an embodiment, the gap formed between the trim and wall surface may be such that caulking may be used as in some traditional installations if so desired by the installer.

Additionally, it is contemplated that, in an embodiment, the magnet may extend substantially the length of the trim molding. The conductor may also extend the same by being substantially the length of the trim molding to be attached to the structure. However, both do not need to extend the substantial length together. For example, the magnetic conductor may extend the length of the trim, but the magnet component may be spaced apart and attached to the trim, with the reverse also being true.

The present apparatus also includes a kit for removable and remountable trim molding. The kit includes a magnet and a magnetic conductor. The magnet includes a first surface and the magnetic conductor includes the same where an adhesive layer is attached to at least one of the first surfaces of either the magnet or magnetic conductor. The second surfaces of the magnet and magnetic conductor operatively align to form a magnetic bond.

It is contemplated that the kit includes the magnetic attachment assembly being provided having both the first surfaces of the magnet and magnetic conductor having an adhesive layer. Typically, the adhesive layer further includes a release paper preserving the adhesive. The term "paper" is used generally and includes most any material including plastics. The adhesive may be a contact or pressure sensitive adhesive. In embodiments, the adhesive is stronger than the bond created between the magnet and the magnetic conductor.

The kit can further include any tool useful in creating a recess within the molding such that the magnetic attachment assembly can reside therein and enable the trim to sit substantially flush with the wall or ceiling of the structure. Such tools can include a router or bit, by way of example and not limitation.

The magnetic attachment assembly must have both the first surfaces of the magnet and the magnetic conductor in contact with the wall and/or trim to form the mechanical or chemical bond. The magnet and the magnetic conductor do not need to be in physical contact in an embodiment, only that a magnetic bond is formed between the second surfaces of the two to securely hold the trim to the wall. Such an arrangement will enable the trim to sit totally flush with the wall and aid in preventing the need to caulk the wall.

Furthermore, the kit can include the trim piece having a recess whereby the recess is operatively sized to house the magnet or conductor. Additionally, the trim piece may include a preinstalled magnetic assembly within the recess, such that only the first surface of one of the magnetic components requires an adhesive layer to attach to the wall or ceiling of the structure.

A further embodiment includes a method of securing the removable and remountable trim molding to a structure. The method includes providing both a magnet and conductor. The method then includes affixing the magnet to the trim molding and affixing the magnetic conductor to the structure. The magnet and magnetic conductor may be affixed chemically in one embodiment using an adhesive and in a further embodiment mechanically. Additionally, both methods for affixing may be used in combination. The affixation of the magnet and magnetic conductor may also be reversed in a further embodiment. The magnet and magnetic conductor are operatively aligned and secured to the trim and molding to the structure.

Referring now in greater detail to the drawings in which like numerals indicate like parts throughout the several views, depicted are apparatuses and methods according to various embodiments of the present invention.

FIG. 1 illustrates an embodiment of the present apparatus and method showing a perspective view of one embodiment of the trim molding 12 having a recess 10 for receiving the magnetic attachment assembly 2. The recess 10 may be sized to fit the magnetic attachment assembly 2 and the trim molding 12 may have a plurality of recesses 10 for receiving a plurality of assemblies 2. Furthermore, the recess 10 may extend substantially the length of the trim 12 for receiving one or more assemblies 2. The trim 12 may be any type of trim including, but not limited to, baseboards and crown molding.

Figure 2:
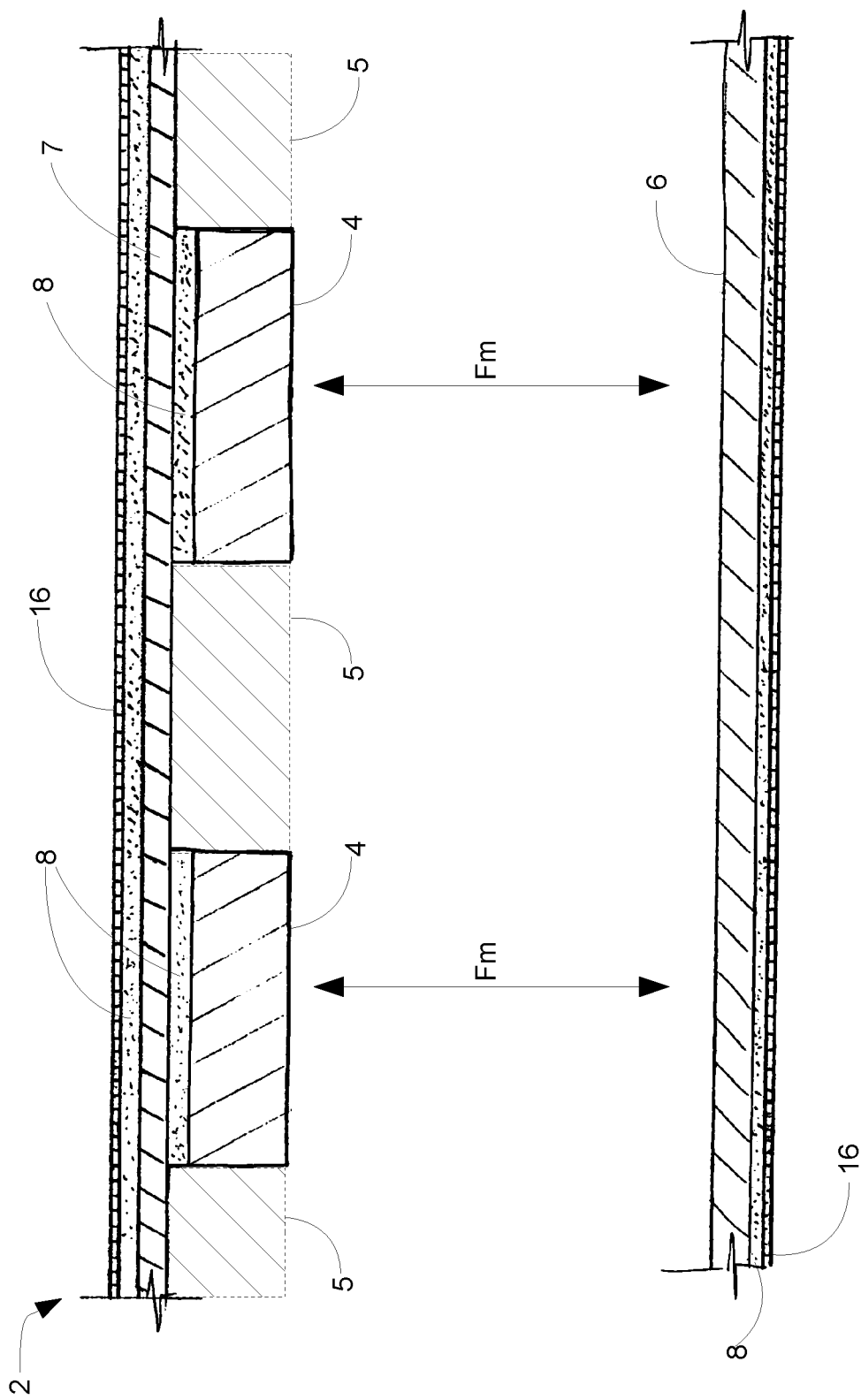
FIG. 2 illustrates a cross section view of a magnetic attachment assembly including a magnet and a magnetic conductor in cooperation with each other according to an exemplary embodiment.

FIG. 2 depicts a further embodiment of the apparatus showing the magnetic attachment assembly 2 formed by a plurality of magnets 4 and the magnetic conductor 6 in cooperation with each other. As illustrated, the magnets 4 and the magnetic conductor 6 experience an attractive magnetic force Fm. Additionally, FIG. 2 further shows an embodiment having an adhesive layer 8 and release paper 16 adjacent to the adhesive layer 8. Both the magnet and the magnetic conductor 6 may have an adhesive layer 8 and/or release paper 16 in an embodiment. While shown having a particular shape, the magnetic attachment assembly 2 may have most any shape including round, square, and rectangular. The magnet 4 and the magnetic conductor 6 need not be the same shape. Also, as illustrated in FIG. 2, the magnets 4 are enclosed by plastic 5 to form a lengthwise rail running along a mounting strip 7.

Figure 3:
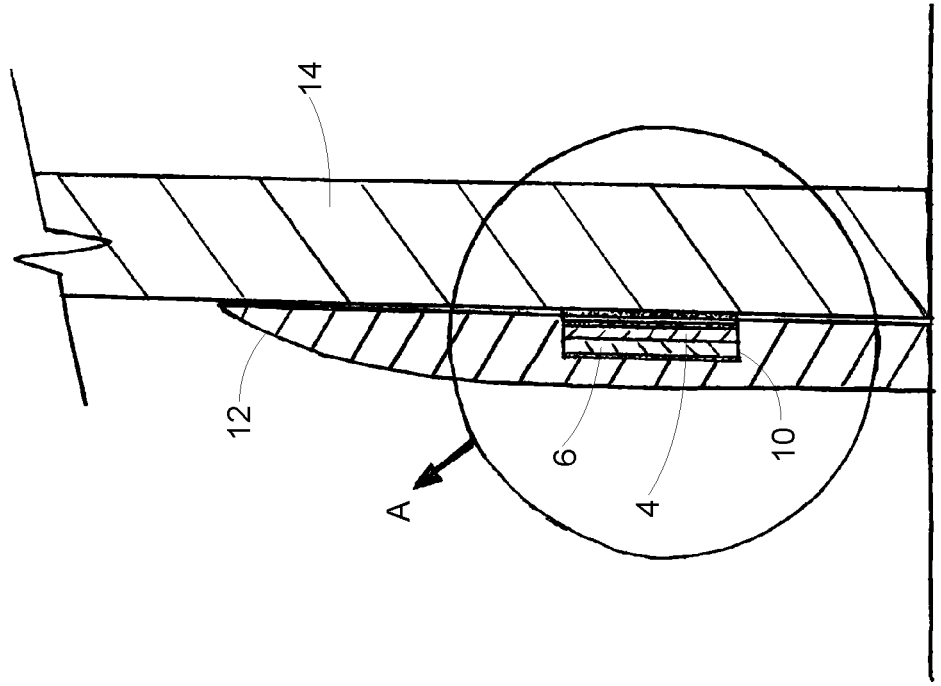
FIG. 3 illustrates a cross section view showing the trim molding of FIG. 1 attached to a wall of a structure utilizing the magnetic attachment assembly of FIG. 2 installed in the recess of the trim molding.
Figure 4:
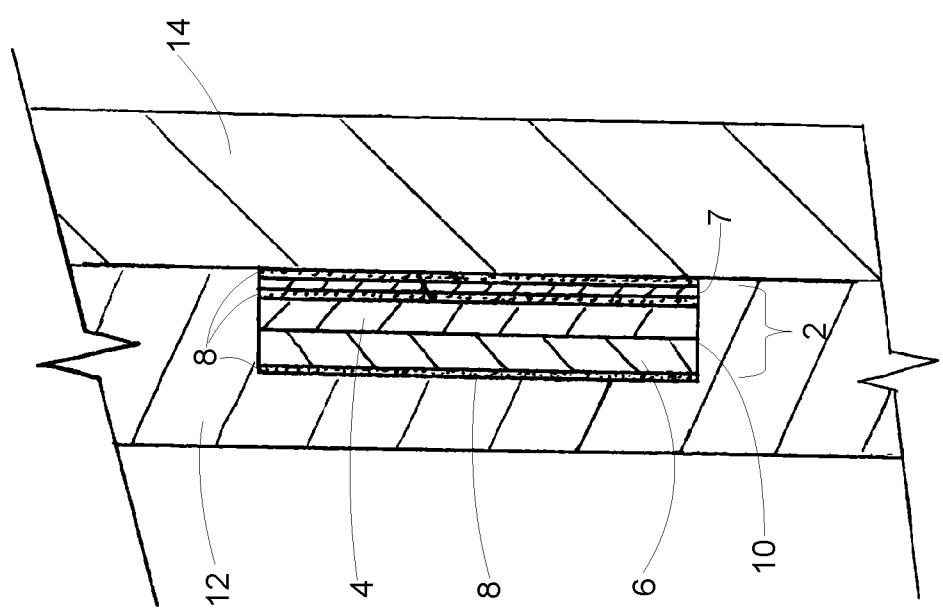
FIG. 4 illustrates an enlarged cross section view of the area of FIG. 3 labelled A.

FIG. 3 illustrates the apparatus and method in a sectional view showing a first material 12 being a trim molding attached to a surface 14 being a structure wall in this example. FIG. 4 shows an enlarged section view of the portion labelled A in FIG. 3. As illustrated, the trim piece material 12 includes a recess 10 containing the magnetic attachment assembly 2 with the magnet 4 and the magnetic conductor 6.

FIG. 5 to FIG. 9 are cross-sectional views illustrating various slot 10 configurations for retaining a magnetic conductor 6 therein.

Figure 5:
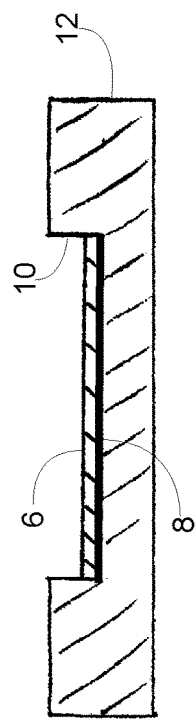
FIG. 5 illustrates a cross section view of a straight-sided slot having a conductor adhesively bonded therein to a bottom of the slot according to an exemplary embodiment.

Having reference to FIG. 5, in some embodiments the magnetic conductor 6, typically a piece of thin steel, is adhesively fixed to a bottom of a groove or slot 10 formed in the material 12 to be affixed to the surface 14. In some examples, the material 12 may be trim or molding for mounting to a surface 14 such as a wall or ceiling, or the material 12 may be fence boards for mounting to a surface 14 of members forming a fence frame, or the material 12 may be deck boards for mounting to a surface 14 formed by a plurality of spaced apart deck joists.

Figure 10:
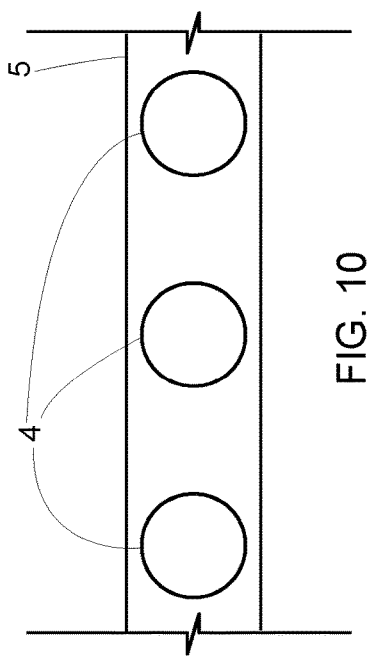
FIG. 10 is a plan view of magnet strip or strapping in which a plurality of spaced-apart magnets are embedded according to an exemplary embodiment.

As illustrated in FIG. 10, a plurality of magnets 4, typically rare-earth magnets, are spaced apart axially along a strip of plastic material 5 and are affixed thereto, such as by an adhesive layer 8. The strip of magnets 4 is then affixed to the surface 14 to which the target material 12 is to be mounted. The strip of magnets 4 can be affixed using conventional fasteners or can be affixed using an adhesive 8, such as an adhesive low in volatile organic compounds (low VOC). In some embodiments, the plastic material 5 on the strip of magnets 4 is generally a relatively flexible strip of polystyrene plastic which has an adhesive 8 applied to the back surface and a paper tape 16 removably covering the adhesive 8. The paper 16 is removed to adhesively bond the strip 7 to the surface. One such suitable adhesive 8 is 3M™ VHB™ tape.

In some embodiments, the slot 10 extends along the length of the target material 12, and the conductor 6 extends along the length of the slot 10. In alternate embodiments, the slot 10 is discontinuous, the conductor 6 being sized to fit the slot 10. In other embodiments, the slot 10 extends the length of the material 12; however, the conductor 6 is discontinuous and affixed at spaced intervals within the continuous slot 10.

Figure 6:
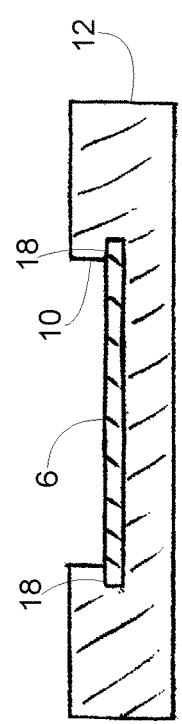
FIG. 6 illustrates a cross section view of a straight-sided slot having radially extending elongate slots formed therefrom into the body of the material for retaining the conductor therein according to an exemplary embodiment.
Figure 7:
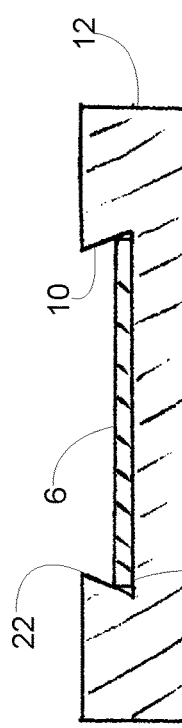
FIG. 7 illustrates a cross section view of a dovetail slot cut into the material for securing the conductor according to an exemplary embodiment.
Figure 8:
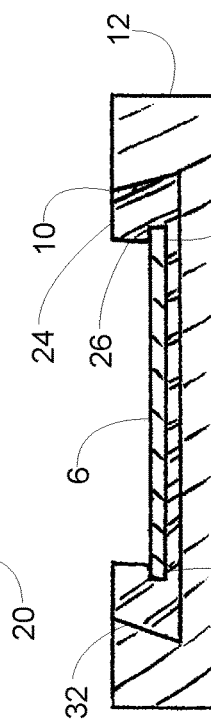
FIG. 8 illustrates a cross section view of an insert fit to a dovetail slot in the material and incorporating the elements of FIG. 6 for retaining the conductor therein according to an exemplary embodiment.

In some embodiments, as shown in FIGS. 6-8, adhesive 8 alone may have insufficient strength to retain the conductor 6 in the slot 10, particularly after several applications of force to break the magnetic bond between the magnets 4 and the conductor 6 for removal of the material 12 from the surface 14. This is especially the case when medium-density fibreboard (MDF) is used for the material 12 to mount such as a baseboard or trim board. MDF is subject to swelling with moisture, which may affect the adhesive 8 bond and the shape and size of the slot 10. Further, when cut, such as to form the slot 10, a plurality of fibres are raised on the surface of the MDF making it difficult to achieve a secure adhesive 8 bond between the material 12 with the conductor 6. To address this issue, in some embodiments, the conductor 6 is further retained, or otherwise held captive, in the slot 10 using mechanical means.

As shown in FIG. 6, the slot 10 is sized smaller in width than the conductor 6 and elongate slits 18 are formed radially outwardly from either side of the slot 10. The conductor 6 is slid from an end of the material 12 into the slits 18 and the slot 10. An adhesive 8 may also be applied to the slot 10 prior to sliding in the conductor 6, if desired.

As shown in FIG. 7, the slot 10 is profiled as a dovetail, a base 20 of the slot 10 being larger in width than a top 22 of the slot 10. The dovetail is dimensioned such that the conductor can be slid into the base 20 of the slot 10 form an end of the material 12 but cannot be lifted out of the slot through the top 22 due to the narrower width at the top 22.

Figure 9:
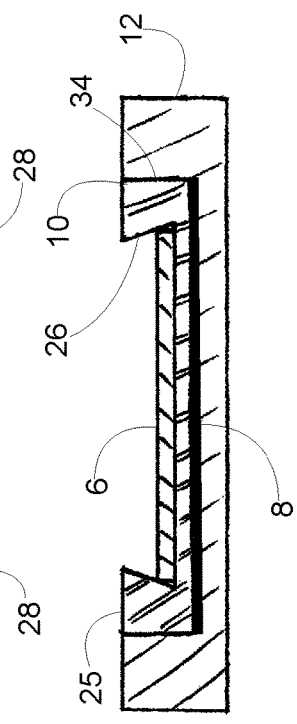
FIG. 9 illustrates a cross section view of an insert fit into a straight-sided slot and having the elements of FIG. 7 for retaining the conductor therein according to an exemplary embodiment.

In some embodiments such as shown in FIGS. 8 and 9, an insert 24, 25 is manufactured, such as by extrusion molding, having a second slot 26 formed therein. The insert 24, 25 mechanically retains the conductor 6 therein either using elongate slits 28 along the edge of the slot 26 formed within the insert 24 (FIG. 8), or forming a dovetail slot 26 within the insert 24 (FIG. 9).

In the embodiment shown in FIG. 8, the insert 24 is formed having outer elongate angled walls 32 that fit within the dovetail slot 10 cut in the material 12. In this case, the insert 24 is slid into the dovetail slot 10 from an end of the material 12. In the embodiment shown in FIG. 9, the slot 10 in the material 12 has elongate straight walls 34 as does the insert 25. The insert 25 can be adhesively bonded into the slot 10 in the material 12 such as via an adhesive layer 8. Advantageously, having an insert 24 manufactured from PVC or other suitable plastic, may allow conventional wood trim and molding manufacturers to produce product material 12 suitable for use in embodiments taught herein without having to tool up to create suitable slots 10 in wood trim and moldings.

Figure 11:
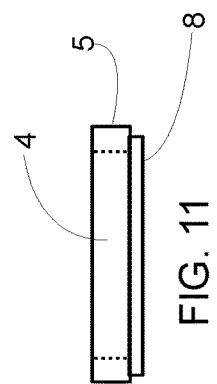
FIG. 11 is an end view of the magnetic strip of FIG. 10 according to an exemplary embodiment.
Figure 12:
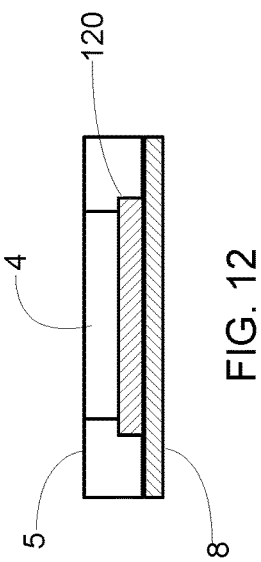
FIG. 12 is a cross-sectional view of the magnetic strip of FIG. 10 according to an exemplary embodiment.

Having reference to FIG. 10, FIG. 11 and FIG. 12, in embodiments as discussed above, magnets 4 are embedded within the strapping or strips 5 and the strips 5. In FIG. 11, the strip 5 includes magnets 4 embedded in therein and the strip 5 has an adhesive strip 8 for attaching to the wall or other desired surface 14. FIG. 12 shows an embodiment where the strip 5 further comprises a strip of metal 120, typically galvanized steel. When the magnets 4 on the magnetic strip 5 engage with the conductor strip 6 in the material to be magnetically mounted to the surface 14, the magnets 4 are sandwiched between two pieces of steel 6, 120. Thus, as is well understood, the pull factor increases significantly, such as about 5 times greater. (see https://www.kjmagnetics.com/calculator.asp.)

In some embodiments, a plurality of holes are made at spaced intervals along a strip of plastic, such as PVC or polystyrene styrene. The holes extend through the strip and have a stepped profile; a larger diameter portion adjacent a back side of the strip and a smaller diameter portion adjacent a front side of the strip. A piece of galvanized steel 120 is inset into the larger diameter portion and a magnet 4 is inset into the smaller diameter portion, thereabove and adhesively bonded thereto. A strip of double-sided adhesive tape 8, such as a polyethylene foam tape (PE foam tape), is affixed to the back side of the strip 5 to permit application to the surface 14.

Figure 13:
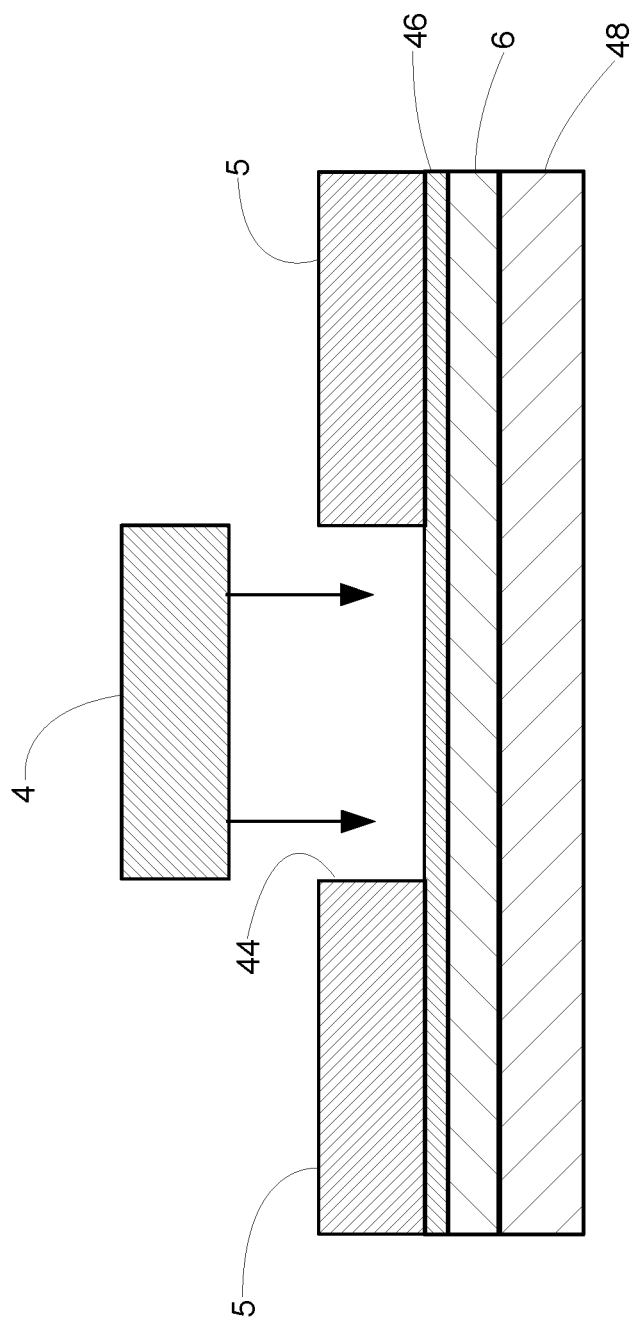
FIG. 13 is a cross section view of a magnet strip attached to an magnetic conductor according to an exemplary embodiment.

In an alternate embodiment, shown in FIG. 13, the strip of plastic 5, as above, has the plurality of spaced-apart holes 44 formed therein having a single diameter. A strip of two-side adhesive tape 46, such as a clear tape, is adhesively bonded to the back side of the strip 5. A strip of galvanized steel acting as the magnetic conductor 6 is adhesively bonded to the other side of the adhesive tape 46. A further strip of double-sided adhesive tape 48, such as a polyethylene foam tape (PE foam tape), is affixed to the back side of the galvanized steel strip 6 to permit application to the surface 14.

Although the above embodiments have focused on the magnets 4 being located on a strip 5 that is secured to a target surface 14 while the magnetic conductor 6 is mounted within a slot 10 on the object material 12, it should be noted that in other embodiments these components locations may be reversed. In other words, the magnets 4 may be secured within the slot 10 on the object material 12 and the magnetic conductor 6 may be mounted on a strip 5 that is secured to a target surface 14. Generally speaking, both the magnets 4 and the magnetic conductor 6 are ferromagnetic devices that together possess an attractive magnetic property that pulls each toward one another. For instance, in the illustrated examples, the magnetic conductor 6 is a first ferromagnetic device that is attached to a trim board or other object 12 that is desired to be attached to a surface 14. The magnets 4 are second ferromagnetic devices that possess attractive magnetic properties pulling toward the first magnetic device (e.g., a steel conductor 6). In general, these two ferromagnetic devices 4, 6 experience magnetic forces pulling each other toward one another and may therefore be swapped in relative positions with each other in different embodiments.

Likewise, in other embodiments, two separate magnets may be utilized as first and second ferromagnetic devices as long as they are configured in the correct orientation such that they experience an attractive magnetic property, for instance, South-pole to North-pole or vice versa. Of course, two ferromagnetic devices such as steel plate magnetic conductors 6 would not experience any attractive magnetic property between them without the presence of an additional permanent magnet so two conductors 6 would not be sufficient to pull toward one another unless one is magnetised to a sufficient degree.

FIGS. 14-18 illustrate a system which utilizes a dovetail insert 24 similar to that shown in FIG. 8 in conjunction with a magnet strip according to an exemplary embodiment. While described herein for mounting a target material 12 such as a baseboard, embodiments of the system can be applied to a variety of materials 12 for magnetically mounting to a variety of different surfaces 14, as previously discussed.

Figure 14:
FIG. 14 illustrates a cross section view of a magnetic conductor according to an exemplary embodiment.
Figure 15:
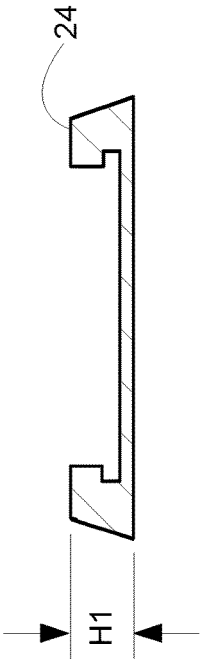
FIG. 15 illustrates a cross section view of a dovetail insert for holding the magnetic conductor of FIG. 14 according to an exemplary embodiment.
Figure 16:
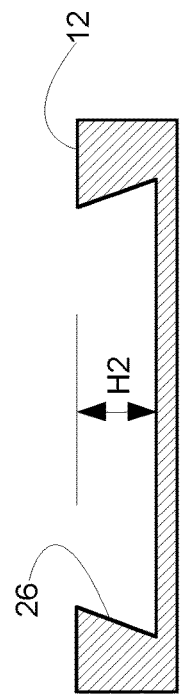
FIG. 16 illustrates a cross section view of a dovetail-shaped insert-holder slot within a target material such as a trim board for holding the dovetail insert of FIG. 15.
Figure 17:
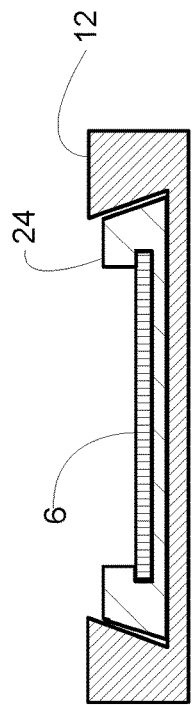
FIG. 17 illustrates a cross section view of the dovetail insert free floating within the dovetail-shaped insert-holder slot.

FIG. 14 illustrates a cross section view of a magnetic conductor 6, and FIG. 15 illustrates a cross section view of a dovetail-shaped insert 24 for holding the magnetic conductor 6 of FIG. 14 according to an exemplary embodiment. FIG. 16 illustrates a cross section view of a dovetail-shaped insert-holder slot 26 within a target material 12 such as a trim board for holding the dovetail insert 24 of FIG. 15. As illustrated, the dovetail-shaped insert 24 has a height H1 being less than a depth H2 of the dovetail-shaped insert-holder slot 26. As illustrated in FIG. 17, the dovetail insert 24 is free floating within the dovetail-shaped insert-holder slot prior to the conductor 6 being attracted to a magnet 4. The state of the dovetail insert 24 shown in FIG. 17 may correspond to how a trim board 12 is shipped from a factory or may correspond to the situation after an end user has manually inserted the insert 24 into the slot 26 prior to trim board 12 installation on a wall 14.

Figure 18:
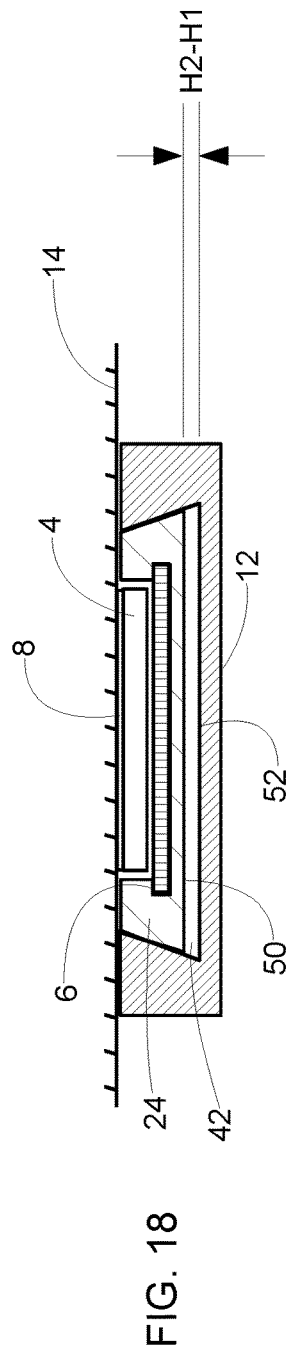
FIG. 18 illustrates a cross section view of the dovetail insert pulled toward a magnet strip secured to a surface 14 such as a wall thereby leaving an air gap between the base of the insert and the base of the insert-holder slot.

FIG. 18 illustrates a cross section view of the dovetail insert 24 pulled toward a magnet strip 4 secured to a surface 14 such as a wall. Because the insert-holding slot 26 has a depth H2 greater than the height H1 of the insert 24, an air gap 42 is formed between the base 50 of the insert 24 and the base 52 of the insert-holder slot 26. The air gap 42 has a distance of H2-H1 in this example. Making the dovetail slot 24 have a vertical depth H2 larger than the height H1 of the insert 24 in some embodiments facilitates insertion of the insert 24 into the slot.

Figure 21:
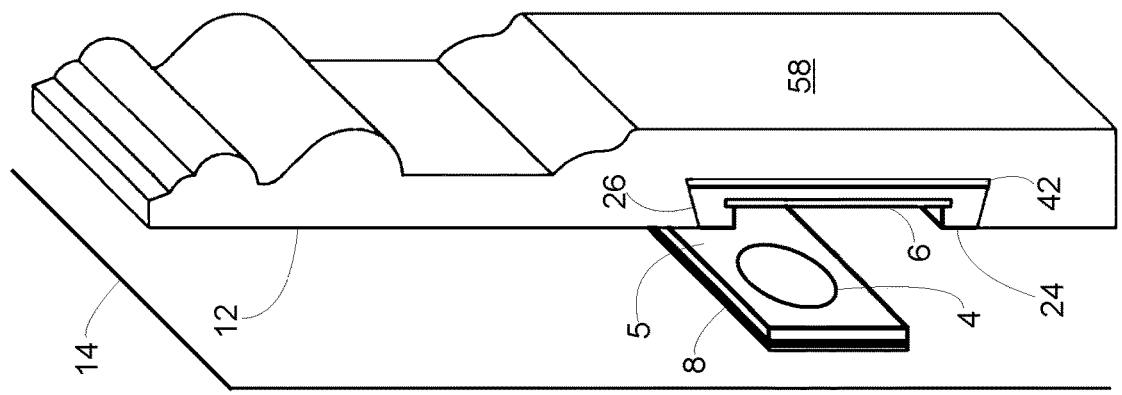
FIG. 21 illustrates a perspective view of a system utilizing the dovetail insert of FIG. 15 in a baseboard for attaching to a magnet strip according to an exemplary embodiment.
Figure 20:
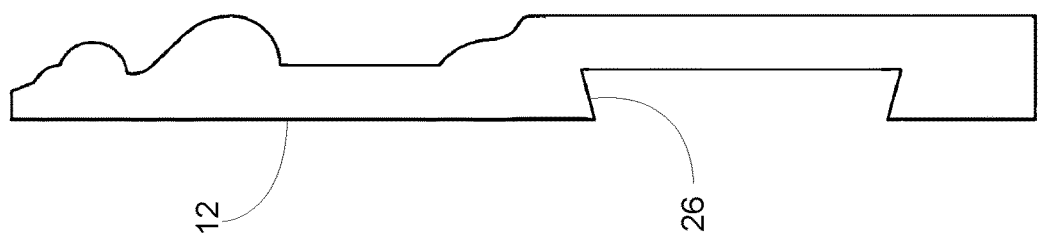
FIG. 20 illustrates an end view of a trim board incorporating the dovetail-shaped insert-holder slot of FIG. 16.
Figure 19:
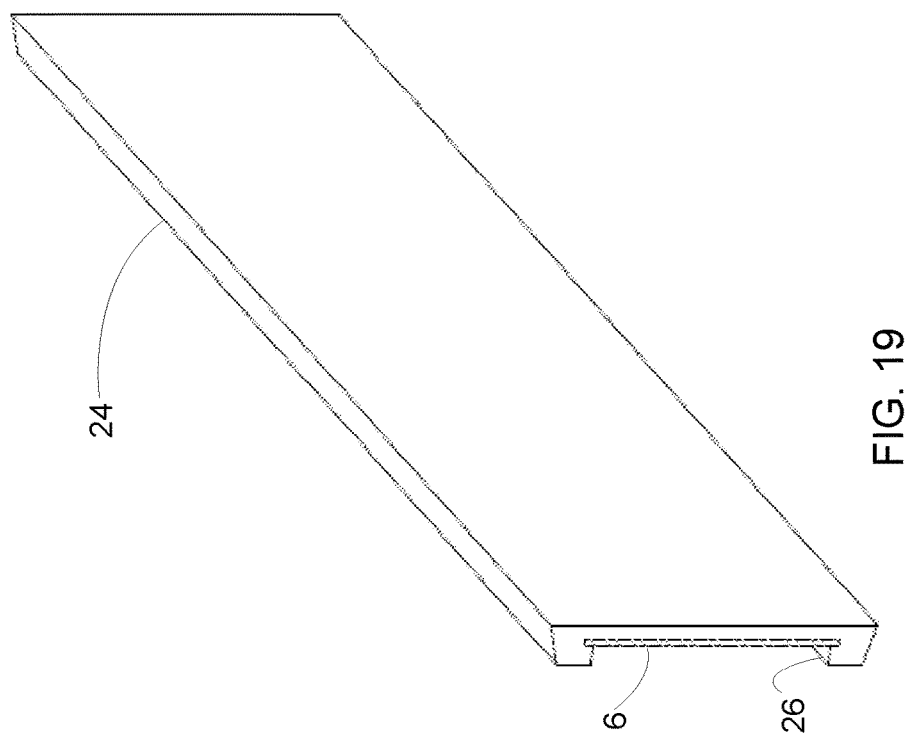
FIG. 19 illustrates a perspective view of the dovetail-shaped insert of FIG. 15.

FIG. 19 illustrates a perspective view of the dovetail-shaped insert 24, and FIG. 20 illustrates an end view of a trim board formed with the material 12 incorporating the dovetail-shaped insert-holder slot 26 of FIG. 16. FIG. 21 illustrates a perspective view of a system utilizing the dovetail insert 26 inserted into a slot 26 in a baseboard 12 for attaching to a magnet strip 5 having a plurality of circular magnets 4 according to an exemplary embodiment.

As can be seen from FIG. 21, even a small gap 42 may greatly ease insertion of the dovetail insert 24 into the slot 26. However, by making the air gap 42 of a sufficient vertical size, removal of the baseboard trim 12 from the wall surface 14 can also be facilitated in conjunction with a magnetic removing tool 54.

Figure 22:
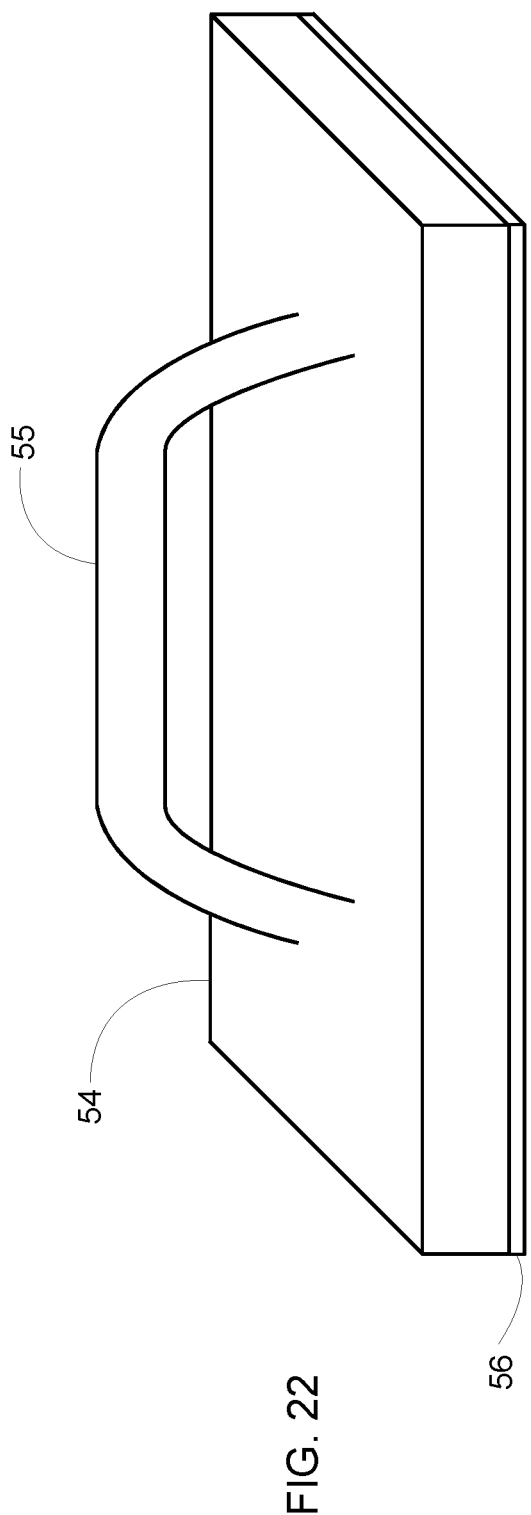
FIG. 22 illustrates a perspective view of a removing tool including a plurality of magnets on an underside for assisting removal of the baseboard from the magnetic strip of FIG. 21.
Figure 23:
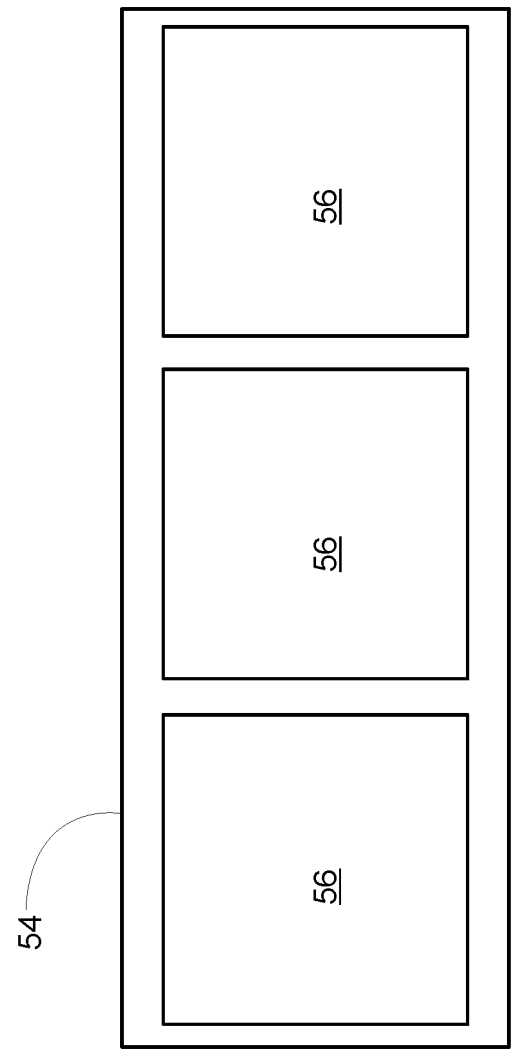
FIG. 23 illustrates a bottom view of the removing tool of FIG. 22.

FIG. 22 illustrates a perspective view of a magnetic removing tool 54 for assisting with removal of the baseboard 12 from the wall surface 14. The removing tool 54 includes a handle 55 and one or more magnets 56 on the underside of the tool 54. FIG. 23 illustrates a bottom view of the removing tool 54 illustrating a plurality of magnets 56. The magnets 56 of the removal tool 54 may be stronger than the magnets 4 of the magnet strip 5.

Referring back to FIG. 18, in some embodiments, the insert 24 and slot 26 are dimensioned such that the air gap 42 has a depth H2-H1 exceeding a predetermined minimum threshold such as 5 mm. Greater air gap distances 42 may be even better; thus, in some embodiments, the insert 24 and slot 26 are dimensioned to create an air gap 42 depth H2-H1 exceeding a predetermined minimum threshold of 1 cm.

To detach the trim board 12 from the wall surface 14, the magnets 56 of the removal tool 54 are held against the outer surface 58 of the trim board 12. The stronger magnets 56 of the removal tool 54 pull on the conductor plate 6 and the insert 24 shifts position away from the magnetic strip 5 and toward the magnets 56 of the removal tool 54. Because the conductor 6 is now further away from the wall strip magnets 4, the attractive magnetic force on the wall strip 5 is reduced.

In some embodiments, to ensure that attractive magnetic forces on the wall strip 5 are reduced, the polarity directions of the magnets 56 in the removing tool 54 are opposite those of the magnetic strip 5. In other words, a same pole of the magnets 4 in the wall strip 5 may face the same pole in the magnets 56 is the removing tool 54. In this way, the magnets 4, 56 will repel each other while the magnetic conductor moves toward the strong of the two, i.e., moves toward the removing tool 54.

As a result of the magnetic conductor 6 moving away from the wall strip magnets 5, the magnetic forces holding the trim board 12 to the wall are reduced. The user may start by holding the removing tool 54 near an end of the baseboard to reduce the holding strength at that end. The user can then manually peel back that end of the trim board 12 from the wall 14. Since the trim board 12 is no longer being strongly held at that end (as a result of the increased distance between the conductor 6 and the wall strip 5), the forces pulling on the wall adhesive 8 are correspondingly reduced. The user may then slide the removing tool down the trim board 12 while peeling the trim board 12 away from the wall. Benefits of the larger air gap 42 and the removal tool 54 in some embodiments include less strength being required by the user to remove the trim 12, less wear and tear on the adhesive 8 during the removal process, and reduced possibility of damage to the wall while removing the trim 12.

Figure 24:
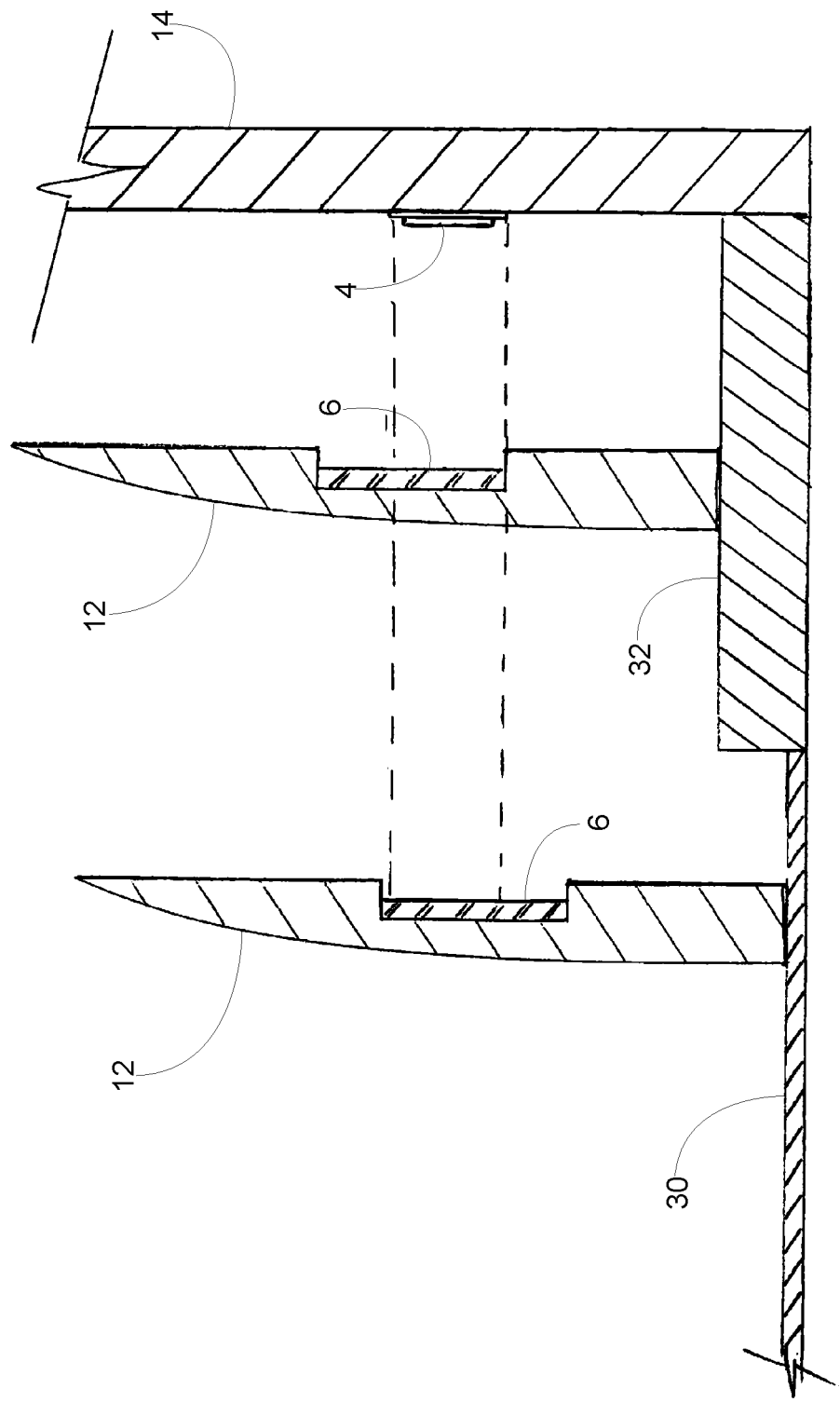
FIG. 24 is a cross section view illustrating an oversize slot for accommodating different heights or widths of material to be magnetically bonded to magnets affixed on a surface according to an exemplary embodiment.

As shown in FIG. 24, and particularly useful for baseboards, the slot 10 can be oversized in width relative to the width of the strip 5 of magnets 4 which is affixed to the wall surface 14. Where the flooring is, for example a polished concrete, linoleum of other low profile flooring 30, the magnets 4 engage the conductor 6 adjacent a top of the slot 10. Where the flooring is hardwood, high pile carpet or other high-profile flooring 32, the magnets 4 engage the conductor 6 adjacent a bottom of the slot 10. Thus, the same baseboard 12 can be used regardless the type of flooring installed.

Figure 25:
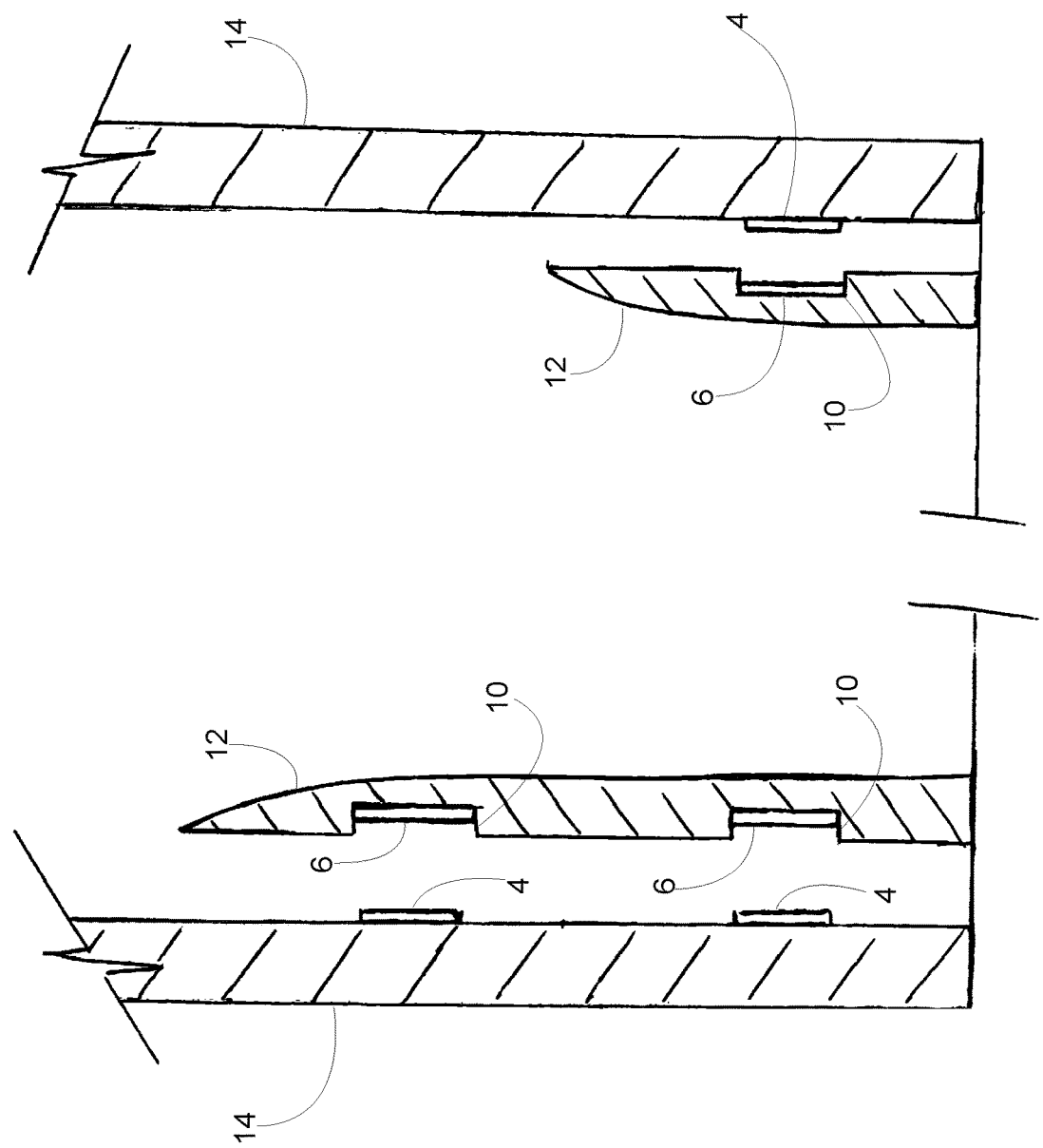
FIG. 25 is a cross section view illustrating a single slot and conductor for engaging a single strip of magnets affixed to a surface and more than one slot and conductor and strip of magnets according to an exemplary embodiment.

Having reference to FIG. 25, in the case of material 12 that is relatively narrow, such as a standard 3½" or 4½" baseboard, a single slot 10 can be provided, whether sized to the magnet strip 5 or oversized relative thereto.

In the case where wider material 12 is to be applied, such as 6" or 7" baseboard, more than one slot 10 can be provided and additional magnet strips 4 can be affixed to the surface 14 to ensure secure engagement therebetween over the width/height of the material 12. Further, where décor is changed and one wishes to use the wider material 12 instead of the narrower/lower material 12 that has already been installed, the narrow material 12 can simply be pulled from the magnet strip 4 and a second magnet strip 4 affixed to the surface 14 spaced thereabove to coincide with the second slot 10 on the wider/taller material 12.

Figure 28:
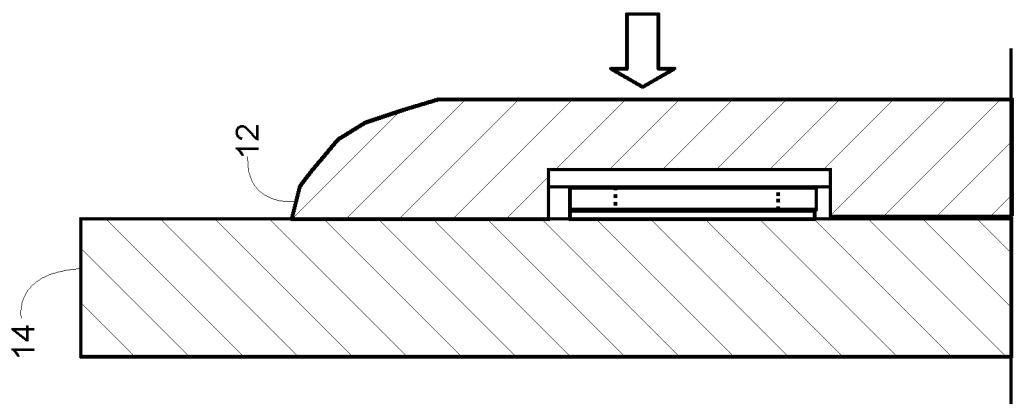
FIG. 28 illustrates a cross section view of pushing the trim board back onto the wall in order to couple the magnetic conductor to the magnetic strip after the separator has been removed according to an exemplary embodiment.
Figure 27:
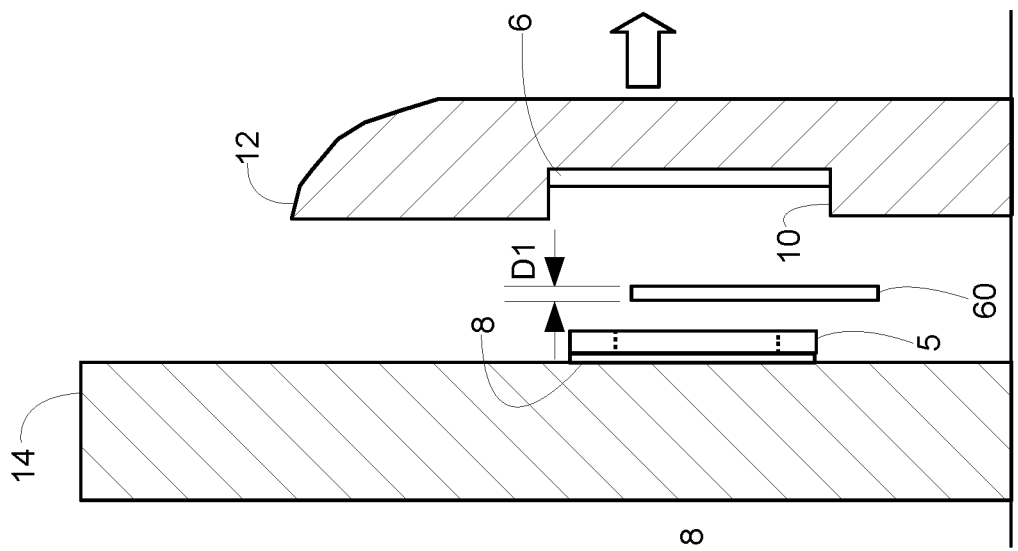
FIG. 27 illustrates a cross section view of pulling the trim board away from the wall after the magnetic strip has been affixed to the wall at the correct position in order to remove the separator from between the magnetic strip and the magnetic conductor according to an exemplary embodiment.
Figure 26:
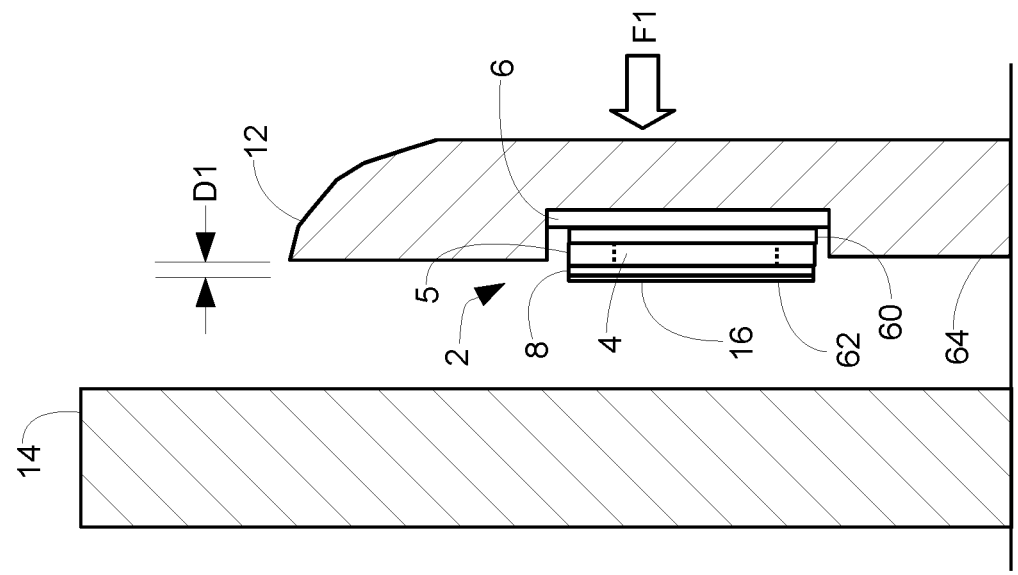
FIG. 26 illustrates a cross section view of installing a magnetic strip to a correct position on a wall by utilizing a removable separator between the magnetic strip and the magnetic conductor according to an exemplary embodiment.

FIG. 26-28 illustrates a cross section view of the trim board 12 and wall 14 in conjunction with a method of installing a magnetic strip 5 to a correct position on the wall 14 by utilizing a removable separator 60 between the magnetic strip 5 and the magnetic conductor 6 according to an exemplary embodiment. The installation process starts by attaching the magnetic conductor 6 to the trim board 12. This may be done manually by the user or may be performed in advance during manufacture. Any of the above-described methods may be employed including dovetail inserts 24 or adhesive, etc.

The magnet wall strip 5 is positioned adjacent the conductor 6 with the removable separator 60 intermediate the conductor 6 and the magnetic strip. The conductor 6 and the magnets 4 in the strip 5 in combination possess an attractive magnetic property pulling each toward one another. The removable separator 60 holds the magnetic strip 5 a predetermined distance D1 away from the conductor 6. The predetermined distance D1 does not prevent the attractive magnetic property from overcoming forces of gravity on the magnetic strip 5. In this way, prior to attaching the magnetic strip 5 to the wall 14, the strip 5 is magnetically held in an initial position adjacent the conductor 6 with the removable separator 60 frictionally held therebetween.

Once the magnetic attachment assembly 2 is configured in the position shown in FIG. 26, the installation process is ready to be performed. The end user removes the release paper 16 from the adhesive 8 and pushes the trim board 12 toward the wall at the desired position and alignment. The adhesive layer 8 affixed on the front side (facing wall 14) of the magnetic strip 5 is pushed against the wall 14. As the user pushes, the adhesive layer 8 bonds to the wall 14 and thereby attaches the magnetic strip 5 to the wall 14.

FIG. 27 illustrates the situation at a next portion of the installation process. At this step, the user pulls the trim board 12 away from the wall 14 to thereby overcome the attractive magnetic property and pull the conductor 6 away from the strip 5, which is now securely attached to the wall 14. Because of the inclusion of the separator 60, the magnetic strip 5 and the conductor are already separated by distance D1 and the magnetic force is easier to overcome by the user and also reducing forces exerted on the adhesive 8.

After the conductor 6 is pulled away from the second ferromagnetic device, the user removes the separator 60 from between the magnetic strip 5 and the conductor 6. In some embodiments, the separator 60 is a non-ferromagnetic material such as plastic such that it will simply fall away when the trim board 12 is pulled away from the wall 14. The user may thereby easily reach between the trim 12 and wall 14 to grab the separator 60 for removal.

FIG. 28 illustrates a cross section of the installed trim board 12. After the separator 60 is removed, the user pushes the trim board 12 toward the wall 14 such that attractive magnetic property pulls the conductor 6 against the magnetic strip 5 thereby securely attaching the trim 12 to the wall 14. Since the separator 60 has now been removed, the magnets 4 in the strip 5 may now be directly against the conductor 6 providing the maximum magnetic forces for holding the trim 12 to the wall 14.

Another benefit of the above-described installation process including the use of the separator 60 is to facilitate a strong bond of the adhesive 8 to the correct position on the wall 14. As illustrated in FIG. 26, the slot 10 depth in the trim board 12 and various widths of the components 5, 6 may be such that the front edge 62 of the strip 5 sits proud ahead of the front edge 64 of the trim 12 by distance D1. In this way, when the user pushes the trim board 12 against the wall 14 in the configuration of FIG. 26, only the front adhesive 8 edge of the magnetic strip 5 is in contact with the wall. As such, the user's entire force F1 helps to form a strong adhesive 8 bond.

The distance D1 corresponds to the width of the separator 60 in this embodiment. Thus, after the separator 60 is removed and the trim board 12 is attached to the wall 14 in the finished configuration as shown in FIG. 28, the distance D1 is now removed from the magnetic attachment assembly 2 and the magnetic strip 5 is completely contained within the slot 10. Beneficially, there is no gap between the trim board 12 and the wall 14. The aesthetic appeal of the installation is thereby increased.

Figure 29:
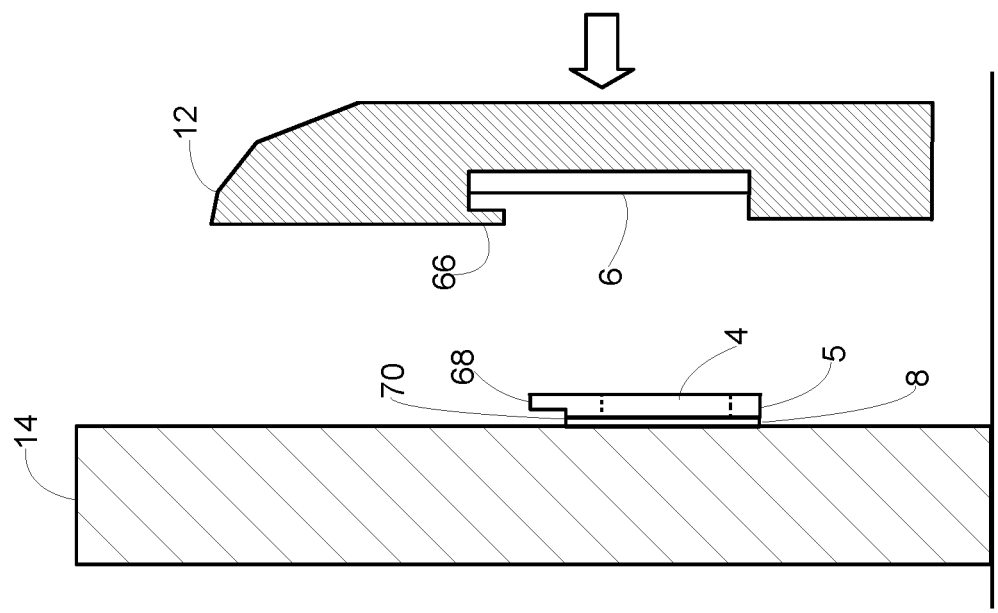
FIG. 29 illustrates a cross section view of magnetically attaching a trim board to a wall with additional hook and grove mechanical support.

FIG. 29 illustrates a cross section view of magnetically attaching a trim board 12 to a wall 14 with additional hook and grove mechanical support. In this embodiment, the slot 10 on the trim board 12 includes a first ridge 66 acting as a hook. The magnetic strip 5 likewise includes a second ridge 68 that in combination with the side of the wall surface 14 forms a grove 70.

Figure 30:
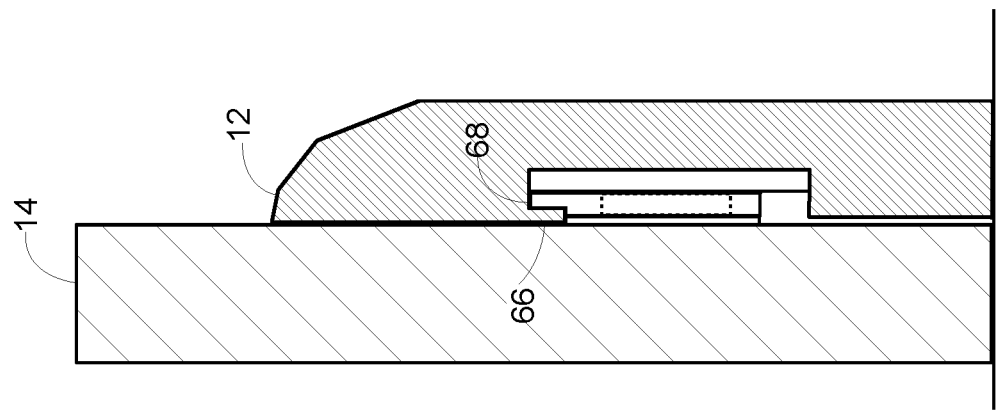
FIG. 30 illustrates a cross section view of the trim board of FIG. 29 after installation to the wall.

FIG. 30 illustrates a cross section view of the trim board 12 of FIG. 29 after installation to the wall 14. As illustrated the first ridge 66 is inserted into the grove 70 to help mechanically secure the trim board to the wall in addition to the magnetic forces of the magnets 4 attracting the conductor 6.

Figure 58:
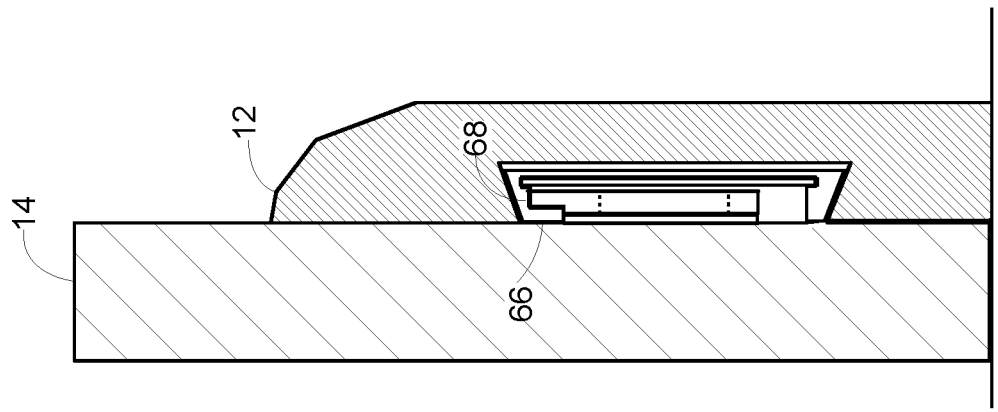
FIG. 58 illustrates a cross section view of the trim board of FIG. 57 after installation to the wall.
Figure 57:
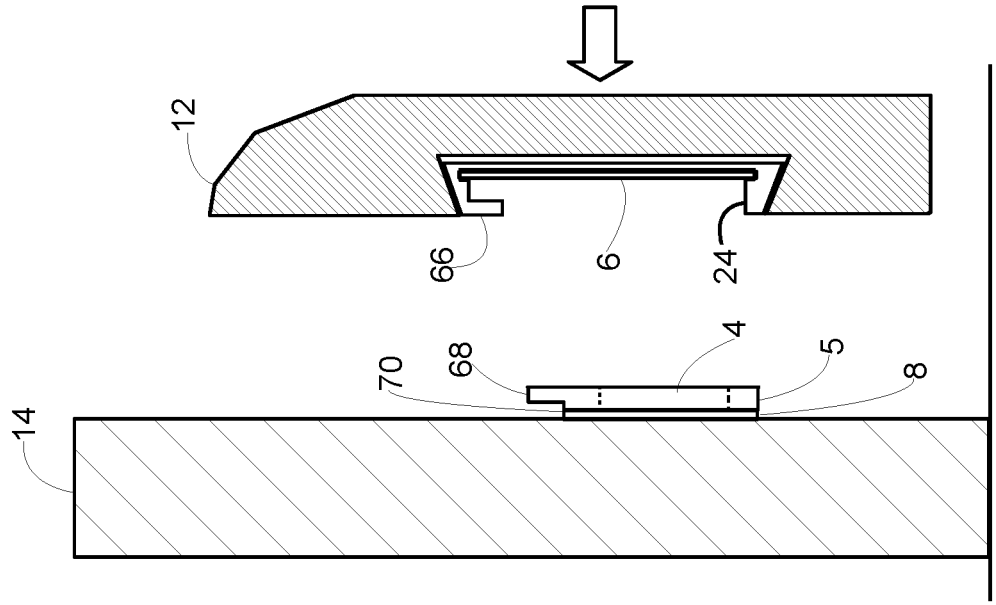
FIG. 57 illustrates a cross section view of magnetically attaching a trim board to a wall utilizing the dovetail insert of FIG. 56.
Figure 56:
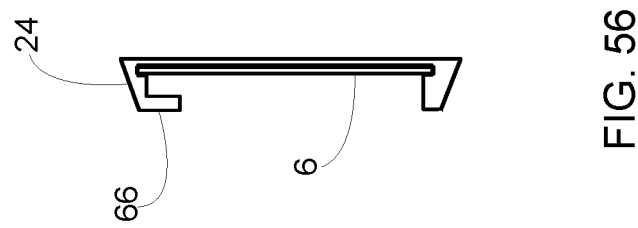
FIG. 56 illustrates a cross section view of a dovetail insert with hook and grove mechanical support for holding the magnetic conductor of FIG. 14 according to an exemplary embodiment.

FIG. 56 illustrates a cross section view of a dovetail insert 24 with hook 66 mechanical support for holding the magnetic conductor 6 of FIG. 14 according to an exemplary embodiment. As illustrated, the dovetail insert 24 in FIG. 56 is modified to also include a hook 66 for mating with the grove 70 formed between the magnetic strip 5 and the wall 14. FIG. 57 illustrates a cross section view of magnetically attaching a trim board 12 to a wall 14 utilizing the dovetail insert 24 of FIG. 56 to achieve hook 66 and grove 70 mechanical support. As illustrated in FIG. 58, after installation to the wall, the hook 66 on the insert 24 is inserted and held within the grove 70 formed between the magnetic strip 5 and the wall 14 thereby providing mechanical support in addition to the magnetic support.

Embodiments taught herein are not only useful for attaching trim and moldings to walls and ceilings, as noted above, they are also suitable for affixing decking to a substructure, such as a plurality of spaced apart deck joists.

Figure 31:
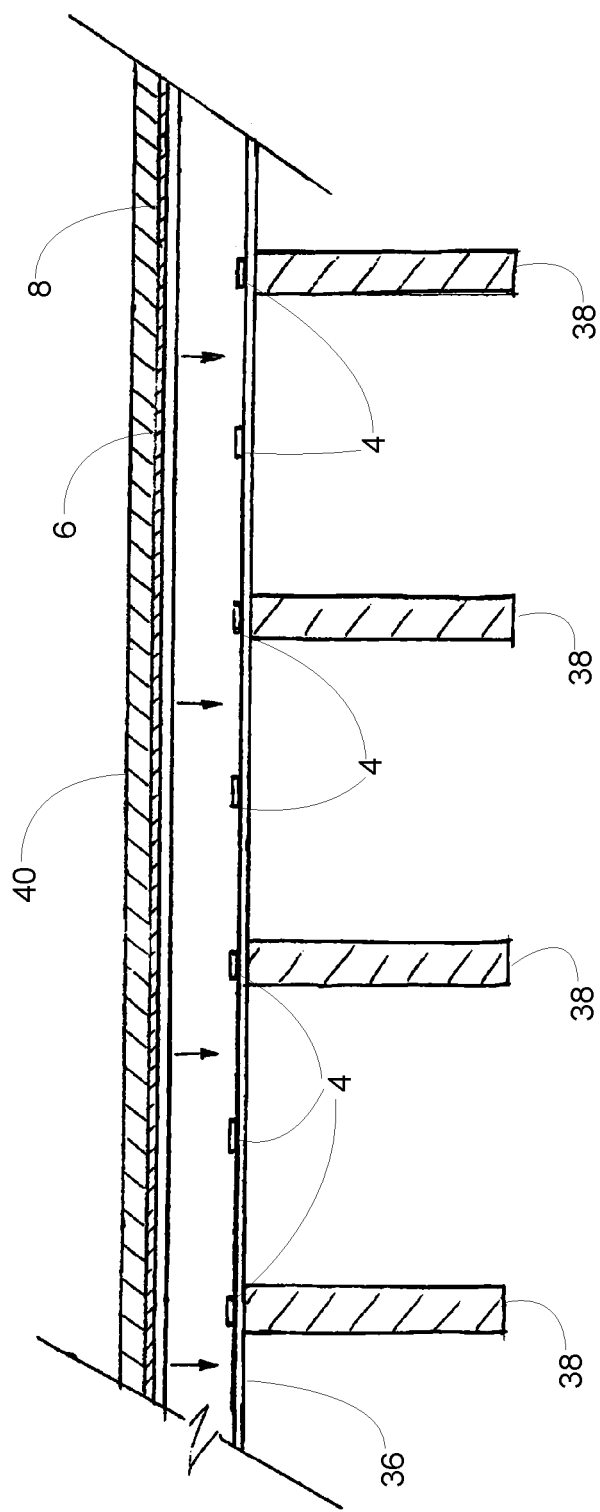
FIG. 31 is a cross section view of a decking system according to an exemplary embodiment.
Figure 32:
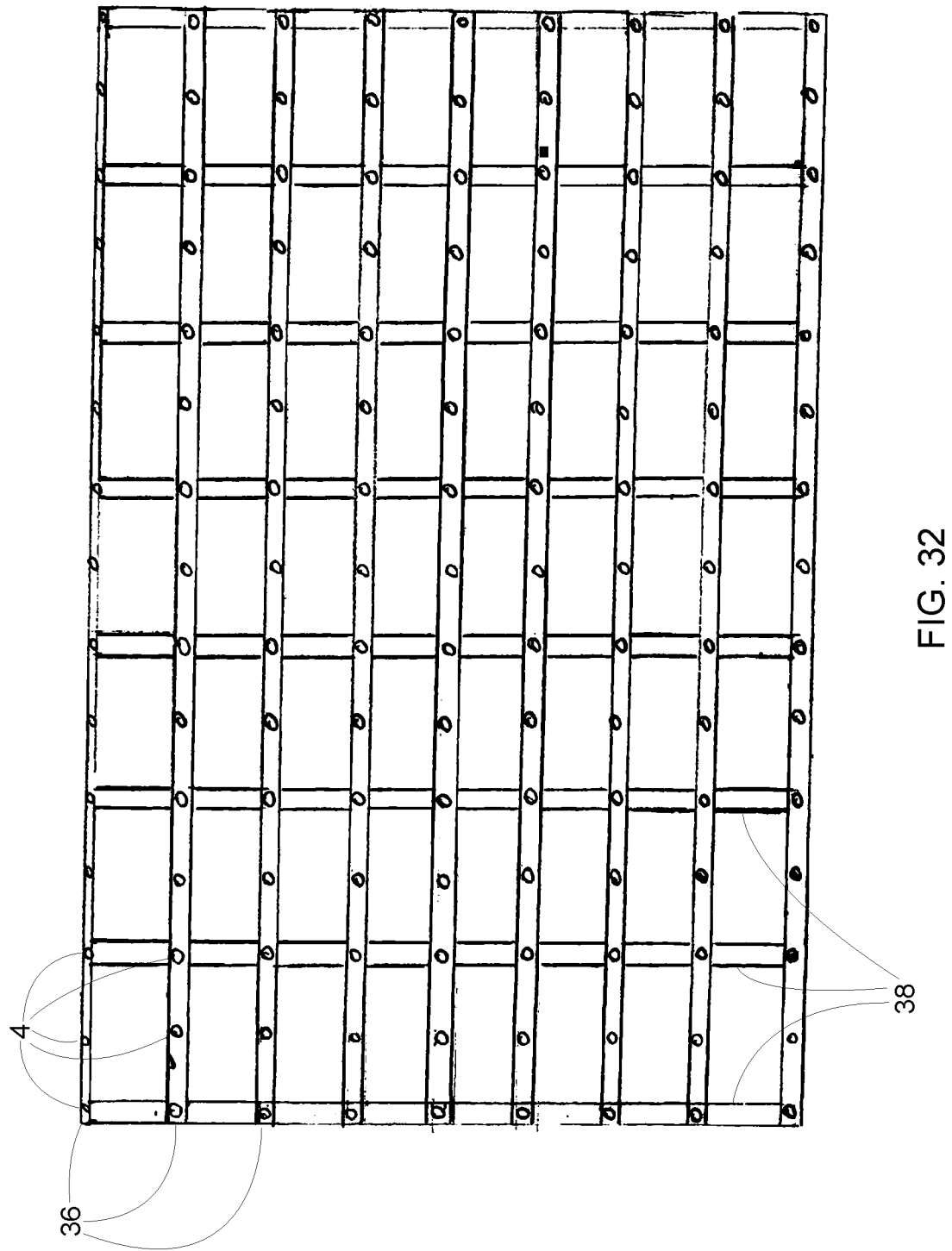
FIG. 32 is a plan view of the decking system of FIG. 31.
Figure 37:
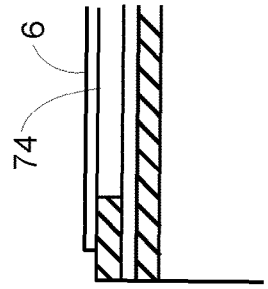
FIG. 37 illustrates a cross section view of the area indicated as reference B in FIG. 35.
Figure 35:
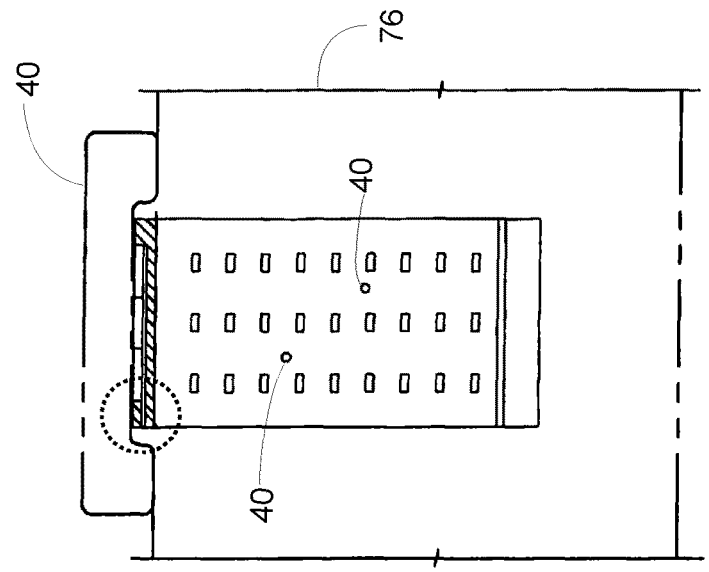
FIG. 35 illustrates an end view of the deck clip of FIG. 34 while installed on the joist.
Figure 36:
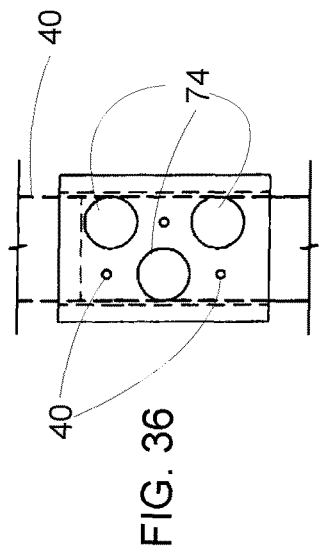
FIG. 36 illustrates a plan view of the deck clip of FIG. 34 while installed on the joist.
Figure 34:
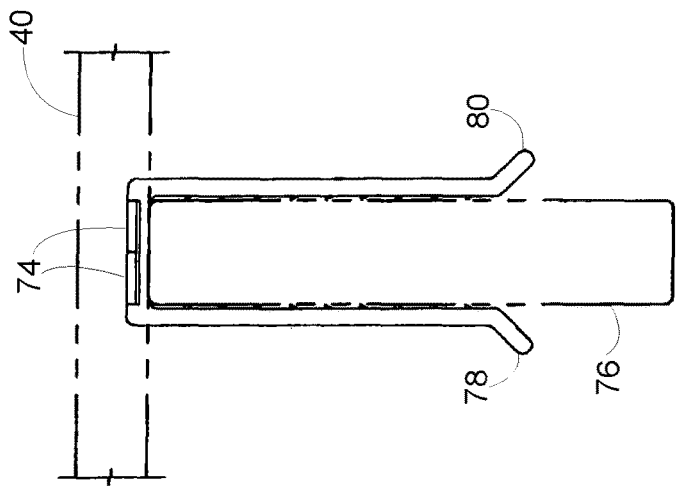
FIG. 34 illustrates a side view of the deck clip of FIG. 33 after installation on a joist.
Figure 33:
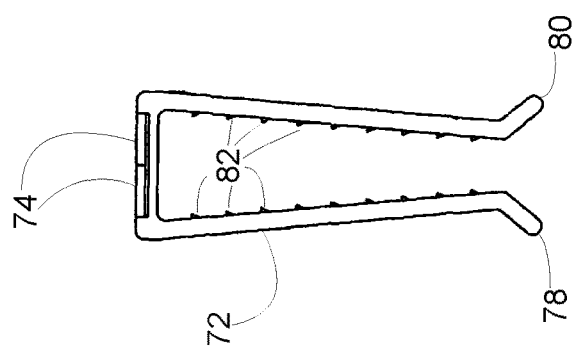
FIG. 33 illustrates a side view of a deck clip used magnetically mounting deck boards prior to installation on a joist according to an exemplary embodiment.

Having reference to FIGS. 31 to 32, metal strapping 36, such as steel strips, are affixed perpendicular to and spanning the deck joists 38 at spaced intervals across the top of the joists 38. In embodiments, the strapping 36 is affixed to the joists 38 using self-tapping screws. A plurality of magnets 4 are affixed to the strapping 36, at spaced intervals along the top surface of the strapping 36, such as by adhesive 8. In some embodiments, the magnets 4 are incorporated into the strapping 36 as discussed in greater detail below. Due to the structural rigidity added to the deck joists by the strapping 36, additional blocking between the joists 38 may advantageously not be required in some embodiments.

Decking boards 40, whether wood, composite decking material such as TREX®, available from TREX Company Inc., Winchester, Va., USA or AZEK®, available from AZEK Building Products Inc., Scranton, Pa., USA, polyvinyl chloride (PVC) composite or wood-plastic composite (WPC) or other suitable materials, is used. Each decking piece or length 40 comprises one or more elongated slot(s) 10 formed therein, along an undersurface leaving the top surface of the board 40 unmarred. The slot 10 may similar to as shown in the above examples where the target material 12 to mount was baseboard trim such as illustrated in FIGS. 5 to 9, for example. The slot 10 further comprises the magnetic conductor 6, generally extending the length of the elongate slot 10, typically the full length of each decking piece 40. Each decking piece 40 is overlaid along a piece of strapping 36, the magnets 4 on the strapping 36 engaging the conductor 6 within the slot 10 and magnetically bonding the decking material 40 to the strapping 36 and the joists 38 to which the strapping 36 is connected.

As will be understood by those of skill in the art, a jig can be used for appropriately spacing the strapping 36 to provide suitable gaps between the decking pieces 40 to allow for any expansion of the materials, such as due to heat, moisture and the like.

In some embodiments, as shown in FIGS. 33 to 37, a decking system utilizes a deck clip 72 (FIGS. 33 and 34) for affixing the magnets 74 to the top surface of the deck joists 76. The pieces of decking material 40, as described above, are then applied to span the joists 76 (FIG. 35), the magnets 74 at each of the joists 76 magnetically engaging the conductor 6 in the slot 43 of each decking piece 40 at each joist 76. (See FIG. 38) Unlike the embodiment discussed above, blocking may be required between the deck joists for increased structural support.

The deck clip 72 comprises a generally U-shaped body having a flat upper surface and two opposing legs 78, 80 forming an open bottom. One or more magnets 74 are retained on the top surface of the clip 72, such as by adhesive. The opposing legs 78, 80 are angled inwardly for gripping the joist 76 therebetween. A bottom of each leg 78, 80 is flared outwardly for engagement, such as by a tool, to facilitate removal of the clip 72 from the joist 76, if required.

Wickers or protrusions 82 are formed on an inner surface of each of the legs 78, 80 for securely engaging the clip 72 with the joist 76 and to withstand upward movement of the clip 72 when decking 40 magnetically bonded thereto is lifted to release from the magnetic bonding for removal from the joists 76. The wickers or protrusions 80 may be formed by punching the material of the legs of the clip 78, 80, typically galvanized steel, to form one or more inwardly and upwardly extending prongs.

Optionally, holes 84 are provided in the legs 78, 80 of the clip 72 to permit fastening of the clips 72 to sides of the joists 76, such as with screws and the like, when positioned thereover. However, the system does not necessarily require the optional fasteners as the clips 72 may securely engage the joists 76 without the need for the optional fasteners in some embodiments.

As will be appreciated, fascia boards and shaped trim can be applied using the concepts taught herein to finish an edge of the deck.

FIG. 38 is a perspective view of a decking system incorporating deck clips 72 of FIGS. 33-37.

FIGS. 39-43 illustrate a decking system utilizing clip 92 with securing loops 91 on the sides prior to installation on a joist 76 according to an exemplary embodiment. The loops 91 may be made metal or plastic and accept and encircle a metal bar 94 that is inserted through the hoops 91 of multiple clips 92 after the clips 92 are mounted to corresponding joists 76. For instance, the metal bar 94 may be a twenty-foot bar of steel. In the embodiment illustrated in FIG. 43, each side of the clip 92 has loops 91 and each side has a corresponding metal bar 94 running therethrough; however, it is to be understand that only a single side may have loops 91 and/or metal bar 94 in other embodiments. The bar 94 is secured with fasteners 96 each either end. The fasteners may be screws utilized to secure a looped end of the metal bar 91 to deck structure such as supporting beams 98 at either end. The loops 91 in conjunction with the bars 94 secured to supporting beams 98 provides additional support to the deck structure.

In addition to trim, baseboards, and decking, embodiments herein may also be utilized in fencing applications. FIG. 44 to FIG. 45 illustrates a fencing system according to an exemplary embodiment.

Having reference to FIGS. 44 and 45, with respect to using embodiments taught herein for fence building, a fence frame 100 is constructed of suitable material. Fence posts 102, such as wood posts or metal posts clad with PVC, are sunk into the ground at spaced intervals. A top, middle and bottom span member 104 is affixed to the posts 102. Strapping 106 having a plurality of spaced apart magnets 108, such as described above for use in deck building, is applied to the finish side of each of the top, middle and bottom span members 104. Fence boards 110, having the slot and magnetic conductor 6 installed therein as described above, are applied vertically to the fence frame 100 for engaging the conductor 6 with the magnets 108. The fence boards 110 are generally spaced apart for forming a small gap therebetween as in conventional fence construction. To prevent others from removing fence boards from the fence by breaking the magnetic bond, a finishing span member 112 is applied over the fence boards on the finished side of the fence at the top of the fence and at the bottom of the fence, such as using conventional fasteners. FIG. 45 is illustrated with a portion of the fence post and the fence board having been removed for clarity and finishing span members 112 having been attached for preventing removal of the fence boards 110.

FIGS. 46 to 49 illustrates a side view of a fencing system including a fence clip 114 with a plurality of magnets 116 positioned on the side of the clip 114 according to an exemplary embodiment. As illustrated, the clip 114 in this embodiment differs from the previous embodiments by positioning magnets 116 on the sides, for instance of each of the legs of the clip 116. In this way, the clips 114 may be mounted over the fence span systems in order to secure vertical fencing boards 118. Again, screw holes 120 may included on the either or both of the sides and top of the clip 114.

Figure 50:
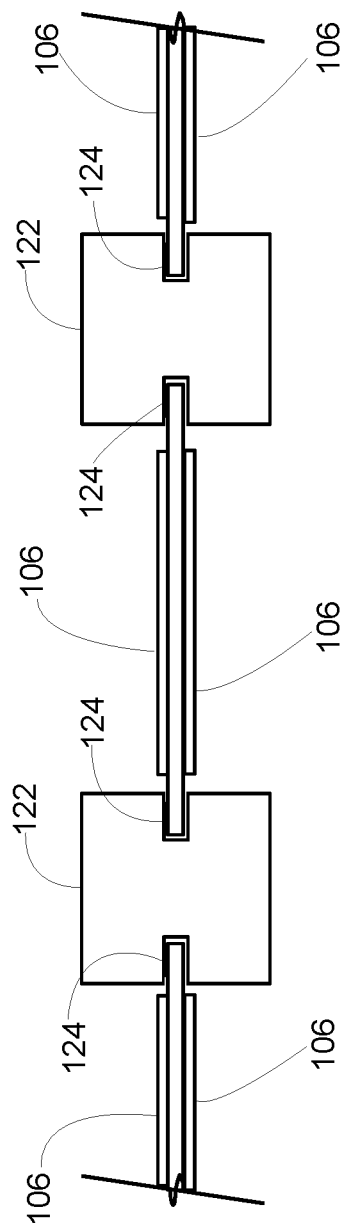
FIG. 50 illustrates a top view of a fence frame having slots in fence posts in order to hold horizontal fence frame boards with magnetic strips running therealong according to an exemplary embodiment.
Figure 51:
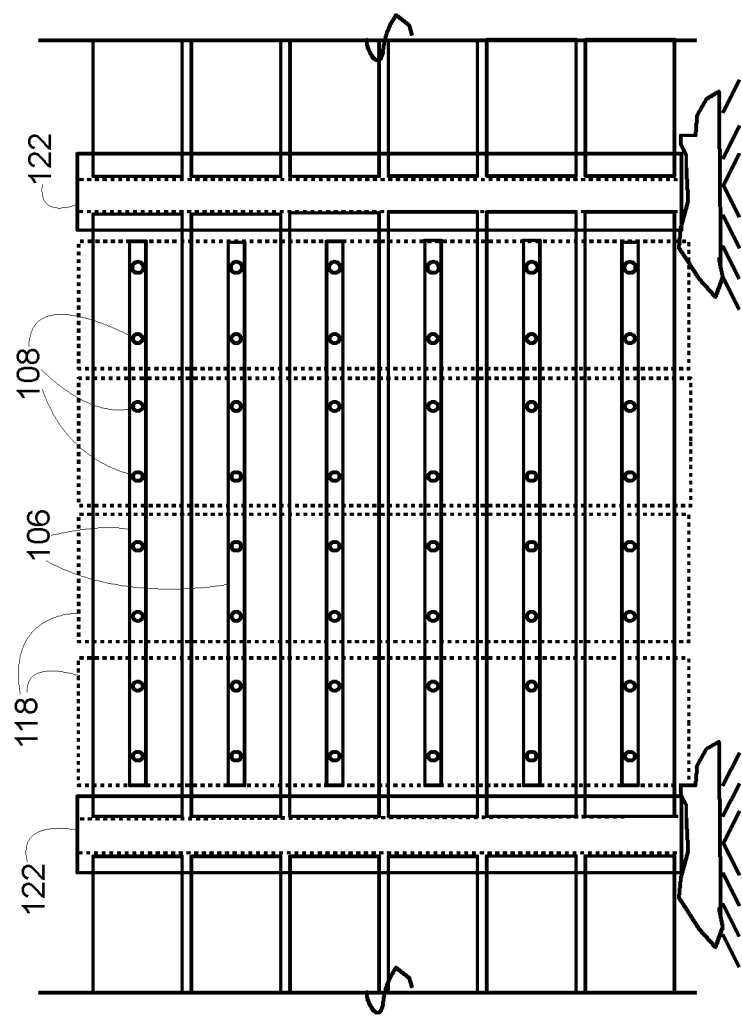
FIG. 51 illustrates a side view of the fence frame of FIG. 50 showing positions of vertical fence boards magnetically attached to the magnet strips.

FIG. 50 illustrates a top view of a fence posts 122 having slots 124 in order to hold horizontal fence frame span boards 104 with magnetic strips 106 running therealong according to an exemplary embodiment. The strips 106 again include a plurality of magnets 108 for magnetically attracting and holding fence boards 118.

Figure 52:
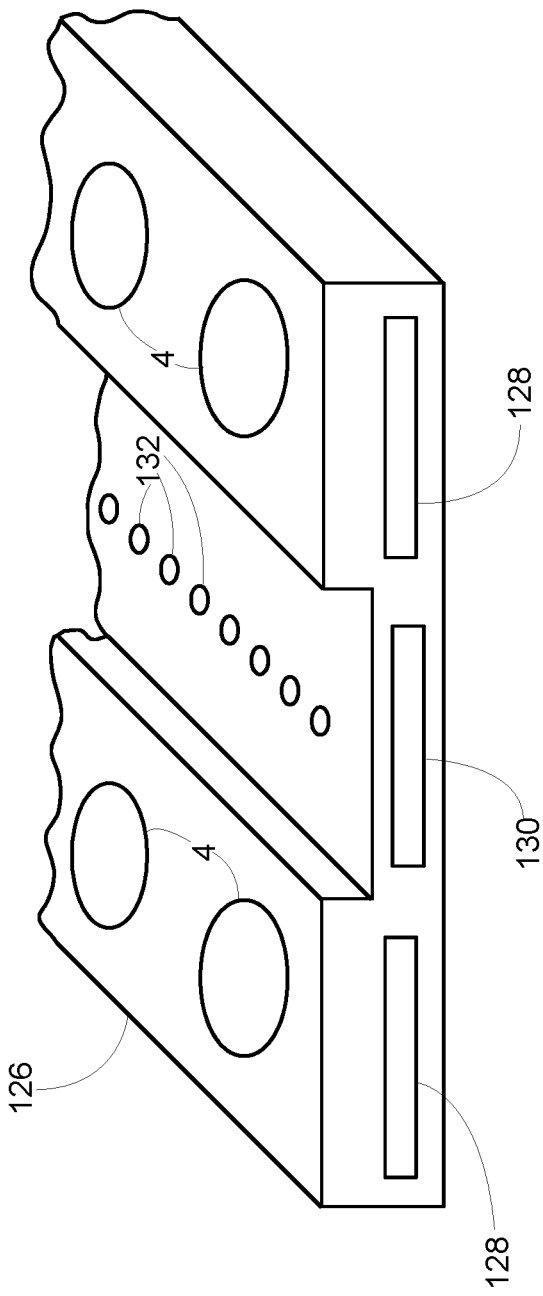
FIG. 52 illustrates a perspective view of a dual magnetic strapping board with integrated steal and aluminum plates according to an exemplary embodiment.
Figure 53:
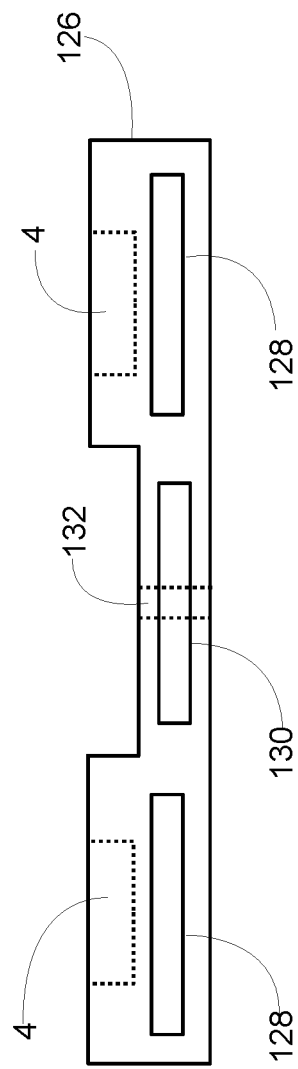
FIG. 53 illustrates an end view of the dual magnetic strip strapping board of FIG. 52.

FIGS. 52 to 53 illustrate a dual magnetic strapping board 126 with integrated steal strips 128 and aluminum plate 130 according to an exemplary embodiment. Dual magnetic strapping board 126 may be utilized for any of the above-described magnetic strips or strapping such as the wall strips 5, floor joists strapping 36, and/or fence strapping 106. The dual rows of magnets 4 attach to corresponding conductors, which may be located in dual slotted boards similar to as illustrated-above in the left-hand trim board 12 of FIG. 25.

Steal plates 128 are mounted under each row of magnets 4. Screw holes 132 are provided for mounting the board to a surface 14 or joists 36, 76. A row of screw holes runs down the center in this embodiment, and the screw holes 130 pass through an alumni plate 130 in order to provide additional strength to the board. In some embodiments, the strapping board 126 is extrusion moulded plastic and the aluminum plate 130 helps provide strength to the board and avoid the screws splitting the board.

Figure 54:
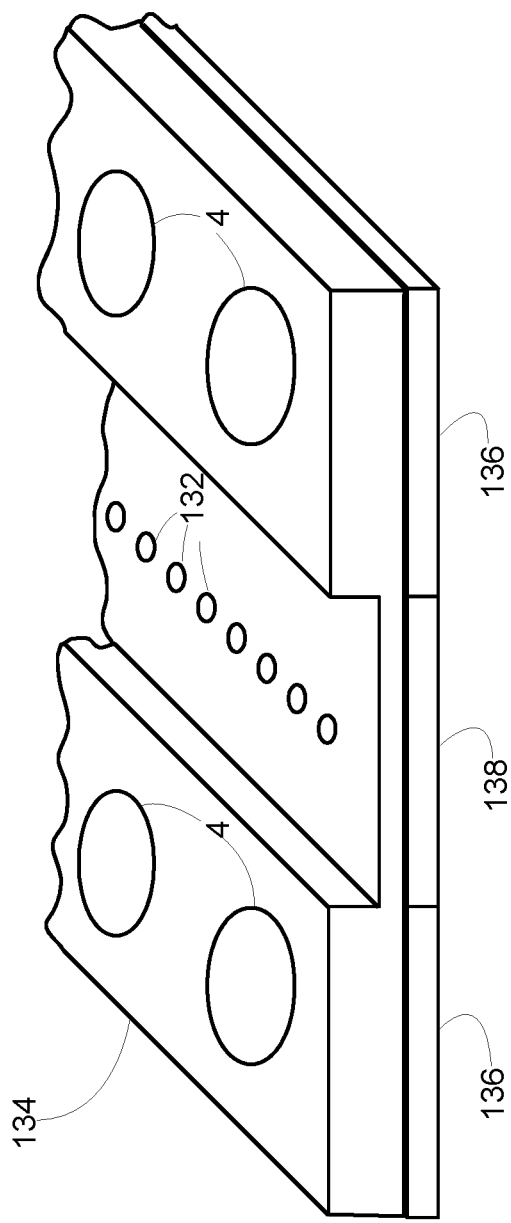
FIG. 54 illustrates a perspective view of a dual magnetic strapping board with layered steel and aluminum plates according to an exemplary embodiment.
Figure 55:
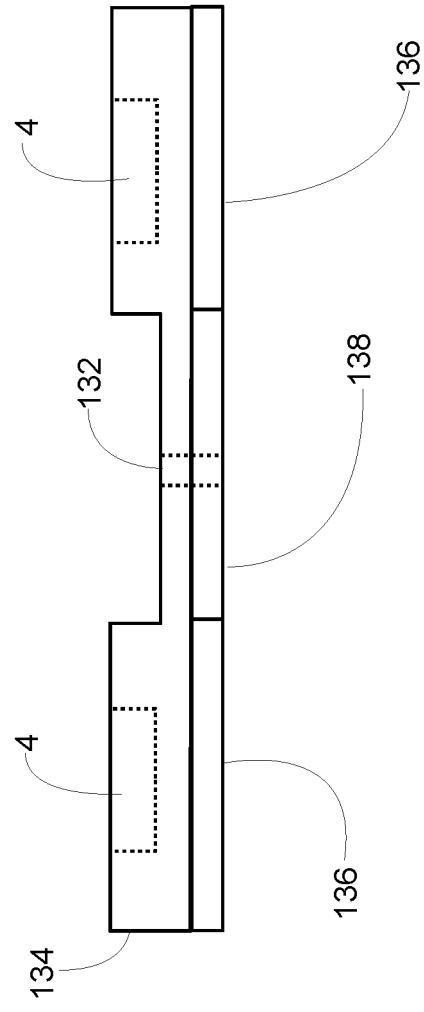
FIG. 55 illustrates an end view of the dual magnetic strip strapping board of FIG. 54.

FIGS. 54 to 55 illustrate a dual magnetic strapping board 134 with layered steel plates 136 and aluminum plate 138 according to an exemplary embodiment. A difference with this embodiment is that the steel and aluminum plates 136, 138 are provided as separate layers under the strapping board 134. This beneficial may be beneficial for board 134 materials like wood that are not extrusion moulded.

Although the invention has been described in connection with preferred embodiments, it should be understood that various modifications, additions and alterations may be made to the invention by one skilled in the art. For instance, in a further embodiments, the trim, deck, and/or fence board material 12 itself is extrusion molded and has the slot formed therein in any of the configurations described above or any other suitable configuration for retaining the conductor therein. One such composition that can be used for extrusion molding of the inserts or for manufacture of the entire material itself is polyvinyl chloride (PVC) or cellular PVC, commonly used to replace standard wood millwork, trims and the like. For aesthetic purposes, the material can be wrapped with other materials such as wood, metal and the like to provide different finishes. Alternatively, the PVC or cellular PVC can be colored to any desired color to complement the aesthetics of the project. Functions of single modules may be separated into multiple units, or the functions of multiple modules may be combined into a single unit. All combinations and permutations of the above described features and embodiments may be utilized in conjunction with the invention.

What is claimed is:

1. A flooring system comprising:
   a first ferromagnetic device affixed to an upper surface of a floor joist;
   a flooring piece having a slot formed along an undersurface of the flooring piece and running lengthwise along the flooring piece;
   a second ferromagnetic device within the slot; and
   a magnetic mounting clip having an inverted U-shape with a flat upper surface and two opposing legs forming an open bottom;
   wherein the first ferromagnetic device and the second ferromagnetic device in combination possess an attractive magnetic property pulling each toward one another;
   the flooring piece is positioned over and across the floor joist such that the second ferromagnetic device within the slot is adjacent the first ferromagnetic device affixed to the floor joist and the attractive magnetic property between the first ferromagnetic device and the second ferromagnetic device magnetically bonds the flooring piece to the flooring joist; and
   the first ferromagnetic device is affixed to the upper surface of the floor joist utilizing the magnetic mounting clip mounted on the floor joist.

2. The flooring system of claim 1, wherein the second ferromagnetic device extends along a length of the slot being a full length of the flooring piece.

3. The flooring system of claim 1, wherein the magnetic mounting clip is made of ferromagnetic material and is the first ferromagnetic device.

4. The flooring system of claim 1, wherein the first ferromagnetic device is affixed to the flat upper surface of the magnetic mounting clip.

5. The flooring system of claim 1, wherein the first ferromagnetic device is mounted into one or more holes in the flat upper surface of the magnetic mounting clip.

6. The flooring system of claim 1, wherein the two opposing legs are angled inwardly toward one another for gripping and affixing the magnetic mounting clip to the floor joist inserted therebetween.

7. The flooring system of claim 1, further comprising a plurality of wickers or protrusions formed on an inner surface of each of the two opposing legs.

8. The flooring system of claim 1, wherein a bottom of each of the two opposing legs is flared outwardly.

9. The flooring system of claim 1, further comprising a securing loop on an outside surface of at least one of the two opposing legs, the securing loop for encircling a bar inserted therethrough for providing additional support.

10. The flooring system of claim 1, further comprising:
    a plurality of magnetic mounting clips mounted on respective ones of a plurality of floor joists;
    wherein a respective first ferromagnetic device is affixed to the upper surface of each of the floor joists utilizing the plurality magnetic mounting clips.

11. The flooring system of claim 1, wherein:
    the first ferromagnetic device comprises one or more magnets; and
    the second ferromagnetic device comprises one or more magnetic conductors.

12. The flooring system of claim 1, wherein:
    the first ferromagnetic device comprises one or more magnetic conductors; and
    the second ferromagnetic device comprises one or more magnets.

13. The flooring system of claim 1, wherein the floor joist is a deck joist.

* * * * *